US008213775B2

(12) United States Patent
Matsuzaki et al.

(10) Patent No.: US 8,213,775 B2
(45) Date of Patent: Jul. 3, 2012

(54) INFORMATION PROCESSING APPARATUS AND METHOD, AND PROGRAM

(75) Inventors: Katsuro Matsuzaki, Kanagawa (JP); Masayuki Inoue, Tokyo (JP); Kanako Nakamura, Tokyo (JP); Shinji Sakai, Tokyo (JP)

(73) Assignee: Sony Corporation, Tokyo (JP)

( * ) Notice: Subject to any disclaimer, the term of this patent is extended or adjusted under 35 U.S.C. 154(b) by 979 days.

(21) Appl. No.: 11/315,921

(22) Filed: Dec. 22, 2005

(65) Prior Publication Data

US 2006/0155401 A1 Jul. 13, 2006

(30) Foreign Application Priority Data

Dec. 27, 2004 (JP) ................................ 2004-375918

(51) Int. Cl.
*G11B 27/00* (2006.01)
*H04N 5/93* (2006.01)

(52) U.S. Cl. ........... 386/285; 386/241; 386/335; 700/94

(58) Field of Classification Search .................... 386/96, 386/94, 335, 285, 241; 700/94
See application file for complete search history.

(56) References Cited

U.S. PATENT DOCUMENTS

| | | | | |
|---|---|---|---|---|
| 6,979,769 | B1 * | 12/2005 | Majima et al. | 84/645 |
| 7,009,920 | B2 * | 3/2006 | Roh et al. | 369/47.11 |
| 2002/0033889 | A1 * | 3/2002 | Miyazaki | 348/232 |
| 2004/0264715 | A1 * | 12/2004 | Lu et al. | 381/119 |

FOREIGN PATENT DOCUMENTS

| | | |
|---|---|---|
| JP | 8-314485 | 11/1996 |
| JP | 2002 300520 | 10/2002 |
| JP | 2003 30932 | 1/2003 |
| WO | WO 98/41978 | 9/1998 |

OTHER PUBLICATIONS

Office Action corresponding to Japanese Application No. 2008-250281.

* cited by examiner

*Primary Examiner* — Thai Tran
*Assistant Examiner* — Girumsew Wendmagegn
(74) *Attorney, Agent, or Firm* — Frommer Lawrence & Haug LLP; William S. Frommer; Thomas F. Presson

(57) ABSTRACT

An information processing apparatus and method for providing images which coincide in reproduction time and atmosphere with BGM as a slideshow to a user. From sound data to be used for production of BGM, a head no-sound interval detection section detects a head no-sound interval and a tail no-sound interval detection section detects a tail no-sound interval while a tail fade-out interval detection section detects a tail fade-out interval. A play interval specification section specifies a play interval of the sound data other than the head and tail no-sound intervals, and an image content allocation section allocates photo album information and effect data to the play interval to produce vector data. A fade-out process setting section updates the vector data so that a fade-out process may be applied to images within the tail fade-out interval.

11 Claims, 24 Drawing Sheets

INFORMATION PROCESSING APPARATUS AND METHOD, AND PROGRAM

CROSS REFERENCES TO RELATED APPLICATIONS

The present invention contains subject matter related to Japanese Patent Application 2004-375918 filed with the Japanese Patent Office on Dec. 27, 2004, the entire contents of which being incorporated herein by reference.

BACKGROUND OF THE INVENTION

This invention relates to an information processing apparatus and method and a program, and more particularly to an information processing apparatus and method and a program by which a photograph slideshow with music can be provided to the user.

A slideshow function of automatically displaying still pictures in order after every predetermined interval of time such as one second is incorporated in various apparatus such as a personal computer which can handle still pictures picked up by a digital camera. In some of such apparatus, a tune to be used as BGM upon slideshow can be selected in accordance with a liking of its user.

Consequently, the user can enjoy still pictures, which are displayed automatically and successively, while enjoying a favorite tune without performing any operation for causing the still pictures to be displayed one by one.

Also an apparatus is available which has a slideshow function which does not display still pictures (picked up still pictures) fetched by the apparatus as they are but successively displays still pictures to which various effects are applied (refer to, for example, "DoCoMo mova P506iC Photococktail™", Internet <URL: http://panasonic.jp/mobile/p506ic/photo/index.html>: hereinafter referred to as Non-Patent Document 1).

In this instance, the user can select still pictures to be reproduced, a type of an effect and a tune of BGM to produce a content with BGM with which the still pictures to which the effect is applied can be displayed automatically and successively.

In such a slideshow (slideshow content with BGM) as described above, image and sound reproduction (outputting or displaying) timings are sometimes displaced from each other such that, for example, although reproduction of BGM comes to an end, display of a still picture continues or conversely, although display of a still picture comes to an end and a dark image or the like is displayed, BGM does not come to an end. In such an instance, the slideshow is low in degree of completeness (amusing property) and may possibly degrade the degree of satisfaction of the user who enjoys the slideshow.

In other words, in such a slideshow content with BGM as described above, the image and sound reproduction timings preferably coincide with each other. In this instance, the slideshow content has a high degree of completeness and provides a high degree of satisfaction to the user who enjoys the content.

As one of methods which make the image and sound reproduction timings of such a slideshow content with BGM coincide with each other, a synchronization technique by manual operation which uses a video editing apparatus as represented by production of a promotion video medium by post production has been established. However, since a slideshow content is produced by manual operation for every tune and every image, a long period of time and a high cost are required for the production. Besides, since the production work is complicated and difficult, high skill is required.

Meanwhile, another method is available wherein control information which associates sound data and still picture data with each other is prepared and is used to reproduce the still picture data in accordance with timings of the sound data. The method is disclosed, for example, in Japanese Patent No. 3334799 (hereinafter referred to as Patent Document 1).

However, the sound data and the still picture data in this instance are particular data designated by the control information and cannot be designated arbitrarily by the user. If it is tried to reproduce or output sound data or still picture data as a slideshow, then since the reproduction time is different among different tunes or depending upon the number of images or the like, it is difficult to control the reproduction correctly with control information prepared in advance.

Thus, as a method wherein the user arbitrarily sets sound and still pictures to be reproduced as a slideshow content with BGM and the reproduction timings of images and sound of the slideshow content with BGM are made coincide with each other readily without imposing a burden on the user, a method is available wherein information of meta data applied to sound data is used to make the reproduction time of images coincide with the reproduction time of sound.

FIGS. 1A and 1B illustrate an example of data of BGM of a slideshow content with BGM. Referring first to FIG. 1A, BGM data 1 includes meta data 2 and sound data 3. The sound data 3 is data including information of a tune itself, and the meta data 2 is additional information to the sound data 3 and is formed from management information and so forth of the sound data 3. The meta data 2 illustrated in FIG. 1A includes information of tune name 4, player 5, composer 6 and reproduction time 7 of the sound data 3.

The BGM data 1 having such a configuration as described above is stored into a BGM data storage area 11 provided in such a storage section of an information processing apparatus which reproduces a slideshow content with BGM as seen in FIG. 1B. The BGM data storage area 11 includes a meta data storage area 12 for storing the meta data 2, and a sound data storage area 13 for storing the sound data 3.

In particular, the information processing apparatus which reproduces a slideshow content with BGM refers to the reproduction time 7 of the meta data 2 stored in the meta data storage area 12 to execute such a process as illustrated in a flow chart of FIG. 2 to produce an image content such that the reproduction time of images (image content) of a slideshow content with BGM may coincide with the production time of the sound data 3 to which the meta data 2 corresponds (reproduction time of a music content of the slideshow content with BGM).

An output data production process executed by the information processing apparatus which produces a slideshow content with BGM is described with reference to the flow chart of FIG. 2.

At step S1, the information processing apparatus acquires meta data 2 of BGM data 1 designated by the user from the meta data storage area 12. At step S2, the information processing apparatus allocates an image content to the BGM data 1 based on the reproduction time 7 (reproduction time information) included in the meta data 2 to produce output data. At step S3, the information processing apparatus reproduces and supplies the produced output data to a displaying and outputting apparatus such as a monitor, a speaker or the like.

FIG. 3 illustrates a relationship between the reproduction times of a sound content and an image content of output data produced in such a manner as described above.

Referring to FIG. 3, a waveform 21 is an output waveform of the sound content along the time axis, and a reproduction time 22 of the sound content represents the period of time of reproduction from the head (time 0) to the tail (time T4) of the data. In other words, in the case of the sound content illustrated, the reproduction time 7 of the sound data 3 included in the meta data 2 of the BGM data 1 corresponds to the reproduction time 22.

The information processing apparatus performs allocation (scheduling) of still picture display to the sound content based on the information of the reproduction time 7 to allocate image data 31. The image data 31 is data of an image content for displaying still pictures A to E in such a schedule as illustrated in FIG. 3, and reproduction time 32 of the image data 31 coincides with the reproduction time 22 of the sound content.

However, the reproduction time 22 of the sound content includes time intervals applied intentionally by a producer of the sound data 3. The time intervals include a no-sound interval 23 at the head of the data (interval from time 0 to time T1), a fade-out interval 24 within which the sound decreases gradually (interval from time T2 to time T3) and another no-sound interval 25 at the tail of the data (interval from time T3 to time T4).

In particular, within the no-sound interval 23, although no sound is outputted, display regarding the still picture A is performed, and within the no-sound interval 25, although no sound is outputted, display regarding the still picture E is performed. Therefore, this slideshow content is low in completeness (amusing property) as a content and may possibly give an insufficient degree of satisfaction to the user who enjoys the slideshow content.

Further, since, also within the fade-out interval 24, display is performed in a similar manner as in the other intervals, the atmosphere of the sound content and the atmosphere of the image content do not coincide with each other, and there is the possibility that the degree of satisfaction of the user who enjoys the slideshow content may be low.

In this manner, such an information processing apparatus in which a slideshow application operates as disclosed in Non-Patent Document 1 or such a reproduction apparatus as disclosed in Patent Document 1 has a subject to be solved in that it is impossible to make the reproduction time of images and the reproduction time of sound of a slideshow content with BGM coincide with each other accurately and to display images suitable for the atmosphere of the sound.

SUMMARY OF THE INVENTION

It is a desire of the present invention to provide an information processing apparatus and method and a program by which images which coincide in reproduction time and atmosphere with BGM can be provided as a slideshow to a user.

In particular, according to an embodiment of the present invention, there is provided an information processing apparatus for reproducing sound data and image data, including a play interval specification section for specifying a play interval within which sound of the sound data to be reproduced as BGM (Background Music) exists, and a reproduction control information production section for allocating the image data to the play interval specified by the play interval specification section and producing reproduction control information for controlling reproduction of the sound data and the image data so that the image data are reproduced only while the reproduction data within the play interval are reproduced.

The reproduction control information may be vector data.

The reproduction control information may include a set of pieces of effect control information of vector data which is control information of effect processes for the individual image data whose reproduction is to be controlled.

The information processing apparatus may further include a head no-sound interval detection section for detecting a no-sound interval at the head of the sound data, and a tail no-sound interval detection section for detecting a no-sound interval at the tail of the sound data, the play interval specification section specifying an interval within a full reproduction interval of the sound data except the head no-sound interval detected by the head no-sound interval detection section and the tail no-sound interval detected by the tail no-sound interval detection section as the play interval.

As an alternative, the information processing apparatus may further include a tail fade-out interval detection section for detecting a fade-out interval at the tail of the play interval specified by the play interval specification section, and a fade-out process setting section for setting the reproduction control information so that a fade-out image process may be applied to the image data allocated to the tail fade-out interval detected by the tail fade-out interval detection section.

As another alternative, the information processing apparatus may further include an additional image process setting section for setting the reproduction control information so that an additional image process may be applied to the image data to which the reproduction control information produced by the reproduction control information production section corresponds.

As a further alternative, the information processing apparatus may further include a reproduction time details information analysis section for analyzing reproduction time details information which is meta data of the image data to acquire information regarding the play interval, the reproduction control information production section producing the reproduction control information based on the information regarding the play interval obtained by the analysis of the reproduction time details information by the reproduction time details information analysis section in place of the play interval specified by the play interval specification section.

As a still further alternative, the information processing apparatus may further include a reproduction time details information storage control section for controlling so that reproduction time details information is produced from the reproduction control information produced by the reproduction control information production section and is stored into a storage section.

As a yet further alternative, the information processing apparatus further include a decompression section for decompressing the sound data where the sound data reproduced as the background music are compressed data.

According to another embodiment of the present invention, there is provided an information processing method for an information processing apparatus for reproducing sound data and image data, including the steps of: specifying a play interval within which sound of the sound data to be reproduced as background music exists; and allocating the image data to the play interval specified by the process at the play interval specification step and producing reproduction control information for controlling reproduction of the sound data and the image data so that the image data are reproduced only while the reproduction data within the play interval are reproduced.

According to a further embodiment of the present invention, there is provided a program for causing a computer to execute a process relating to sound data and image data, including the steps of: specifying a play interval within which sound of the sound data to be reproduced as background music exists; and allocating the image data to the play interval specified by the process at the play interval specification step and producing reproduction control information for controlling reproduction of the sound data and the image data so that the image data are reproduced only while the reproduction data within the play interval are reproduced.

In the information processing apparatus and method and the program, a play interval of sound data reproduced as background music within which sound of the sound data exists is specified, and image data are allocated to the specified play interval. Then, reproduction of the sound data and the image data is controlled so that the image data are reproduced only while the reproduction data within the play interval are reproduced.

With the information processing apparatus and method and the program, images which coincide in reproduction time and atmosphere with BGM can be provided as a slideshow to a user, and the degree of completeness as a content can be raised and the degree of satisfaction of the user who enjoys the slideshow can be enhanced.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENTS

Before a preferred embodiment of the present invention is described in detail, a corresponding relationship between several features recited in the accompanying claims and particular elements of the preferred embodiment described below is described. The description, however, is merely for the confirmation that the particular elements which support the invention as recited in the claims are disclosed in the description of the embodiment of the present invention. Accordingly, even if some particular element which is recited in description of the embodiment is not recited as one of the features in the following description, this does not signify that the particular element does not correspond to the feature. On the contrary, even if some particular element is recited as an element corresponding to one of the features, this does not signify that the element does not correspond to any other feature than the element.

Further, the following description does not signify that the prevent invention corresponding to particular elements described in the embodiment of the present invention is all described in the claims. In other words, the following description does not deny the presence of an invention which corresponds to a particular element described in the description of the embodiment of the present invention but is not recited in the claims, that is, the description does not deny the presence of an invention which may be filed for patent in a divisional patent application or may be additionally included into the present patent application as a result of later amendment to the claims.

According to an embodiment of the present invention, an information processing apparatus (for example, an information processing apparatus 101 of FIG. 4) for reproducing sound data (for example, BGM data of FIG. 11) and image data (for example, photo album information and effect data of FIG. 11) is provided. The information processing apparatus includes a play interval specification section (for example, a play interval specification section 256 of FIG. 11) for specifying a play interval (for example, a play interval 271 of FIG. 14) within which sound of the sound data to be reproduced as background music exists, and a reproduction control information production section (for example, an image content allocation section 260 of FIG. 11) for allocating the image data to the play interval specified by the play interval specification section and producing reproduction control information for controlling reproduction of the sound data and the image data so that the image data are reproduced only while the reproduction data within the play interval are reproduced.

Figure 10:
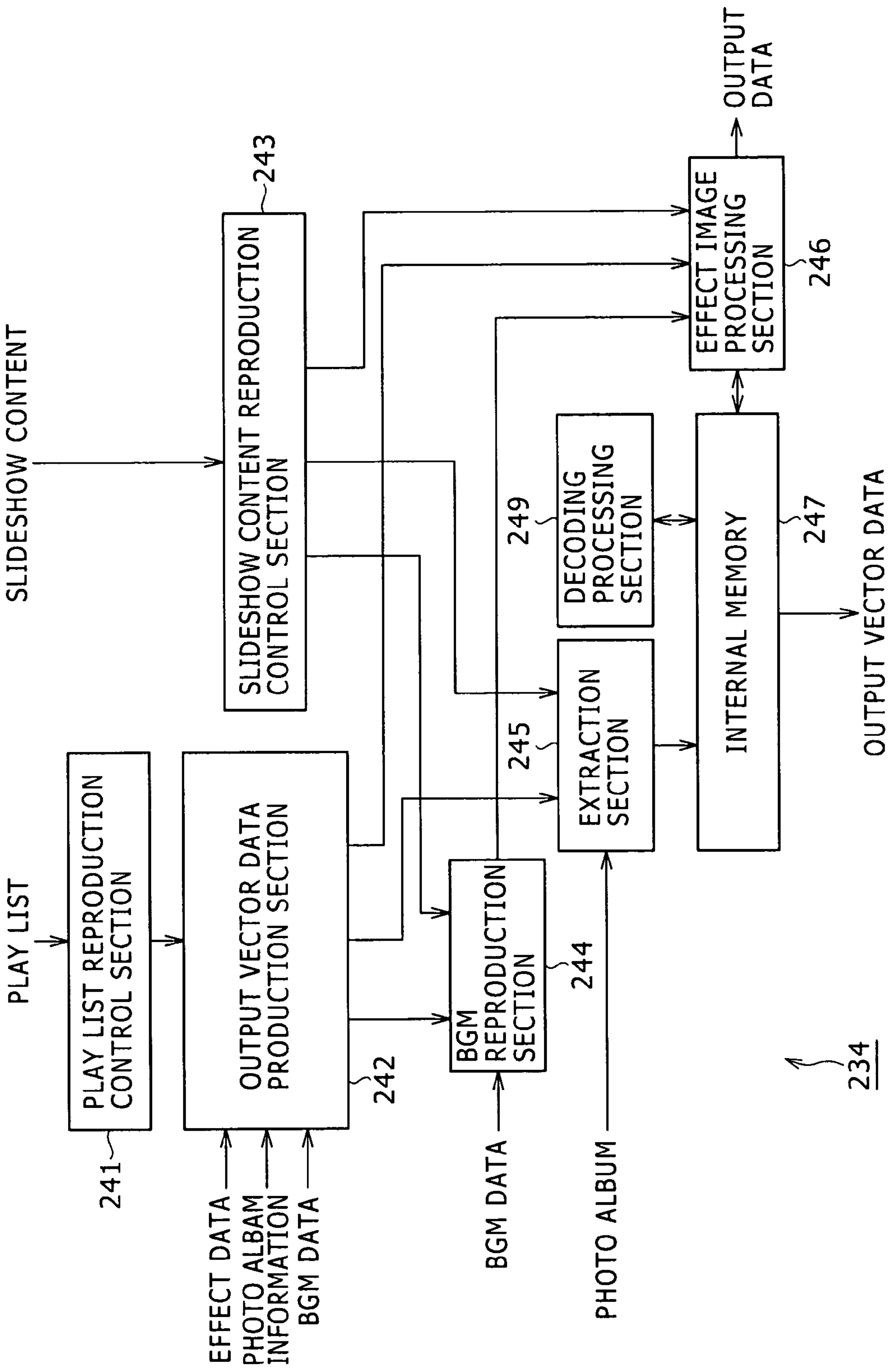
FIG. 10 is a block diagram showing an example of a configuration of a reproduction section shown in FIG. 9.
Figure 11:
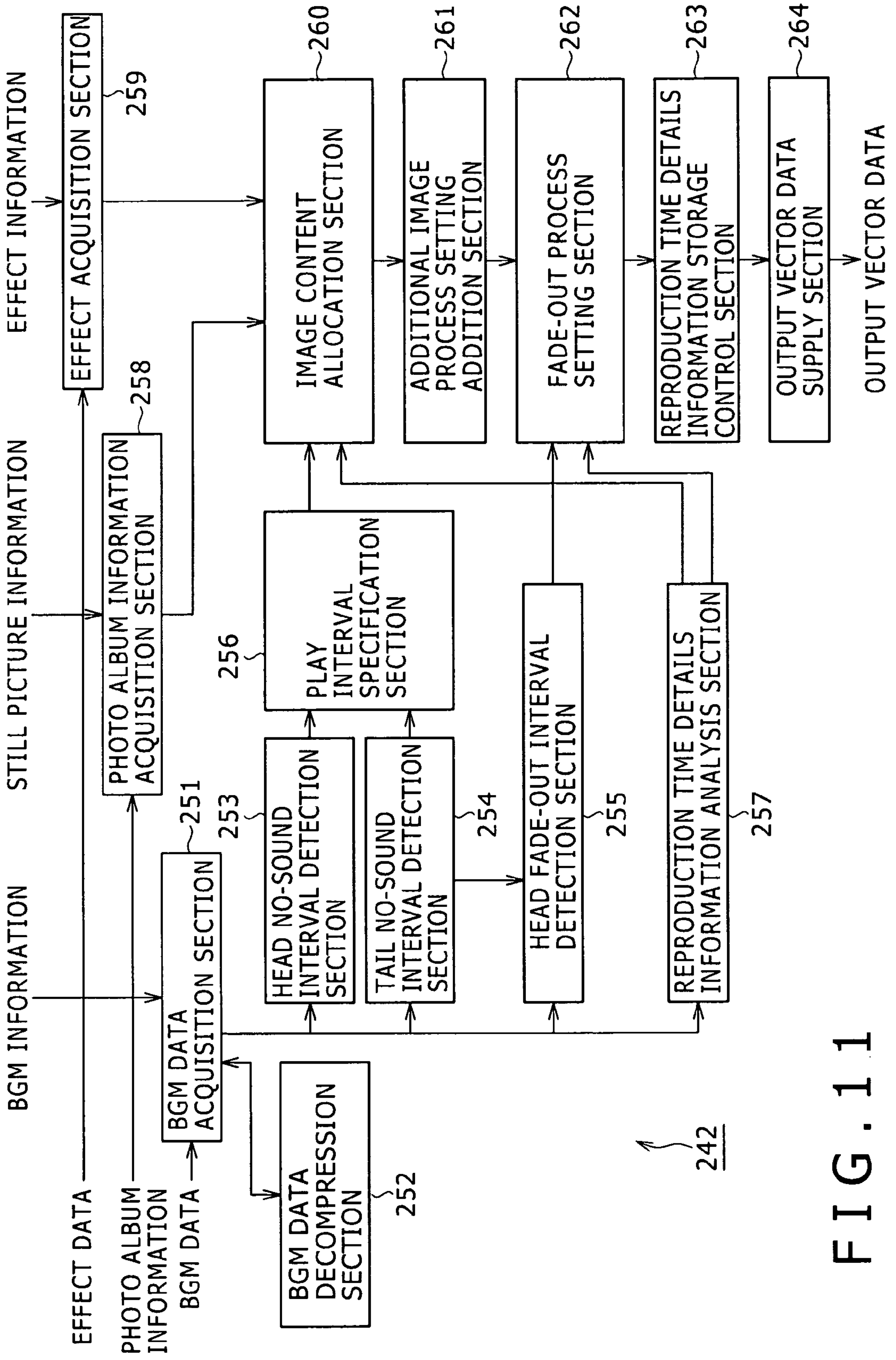
FIG. 11 is a block diagram showing an example of a configuration of an output vector data production section shown in FIG. 10.

The reproduction control information may be vector data (for example, output vector data of FIG. 10 and FIG. 11).

The reproduction control information may include a set of pieces of effect control information (for example, FIG. 5A) of vector data which is control information of effect processes for the individual image data whose reproduction is to be controlled.

The information processing apparatus may further include a head no-sound interval detection section (for example, a head no-sound interval detection section 253 of FIG. 11) for detecting a no-sound interval at the head of the sound data, and a tail no-sound interval detection section (for example, a tail no-sound interval detection section 254 of FIG. 11) for detecting a no-sound interval at the tail of the sound data, the play interval specification section specifying an interval within a full reproduction interval (for example, a reproduction time 22 of FIG. 14) of the sound data except the head no-sound interval (for example, a head no-sound interval 23 of FIG. 14) detected by the head no-sound interval detection section and the tail no-sound interval (for example, a tail no-sound interval 25 of FIG. 14) detected by the tail no-sound interval detection section as the play interval.

The information processing apparatus may further include a tail fade-out interval detection section (for example, a tail fade-out interval detection section 255 of FIG. 11) for detecting a fade-out interval at the tail of the play interval specified by the play interval specification section, and a fade-out process setting section (for example, a fade-out process setting section 262 of FIG. 11) for setting the reproduction control information so that a fade-out image process may be applied to the image data allocated to the tail fade-out interval (for example, a tail fade-out interval 24 of FIG. 14) detected by the tail fade-out interval detection section.

The information processing apparatus may further include an additional image process setting section (for example, an additional image process setting addition section 261 of FIG. 11) for setting the reproduction control information so that an additional image process may be applied to the image data to which the reproduction control information produced by the reproduction control information production section corresponds.

The information processing apparatus may further include a reproduction time details information analysis section (for example, a reproduction time details information analysis section 257 of FIG. 11) for analyzing reproduction time details information which is meta data of the image data to acquire information regarding the play interval, the reproduction control information production section producing the reproduction control information based on the information regarding the play interval obtained by the analysis of the reproduction time details information by the reproduction time details information analysis section in place of the play interval specified by the play interval specification section.

The information processing apparatus may further include a reproduction time details information storage control section (for example, a reproduction time details information storage control section 263 of FIG. 11) for controlling so that reproduction time details information is produced from the reproduction control information produced by the reproduction control information production section and is stored into a storage section.

The information processing apparatus may further include a decompression section (for example, a BGM data decompression section 252 of FIG. 11) for decompressing the sound data where the sound data reproduced as the background music are compressed data.

According to another embodiment of the present invention, an information processing method for an information processing apparatus (for example, an information processing apparatus 101 of FIG. 4) reproducing sound data (for example, BGM data of FIG. 11) and image data (for example, photo album information and effect data of FIG. 11) is provided. The information processing method includes the steps of: specifying (for example, a step S28 of FIG. 12) a play interval (for example, a play interval 271 of FIG. 14) within which sound of the sound data to be reproduced as background music exists; and allocating (for example, a step S33 of FIG. 13) of the image data to the play interval specified by the process at the play interval specification step and producing reproduction control information for controlling reproduction of the sound data and the image data so that the image data are reproduced only while the reproduction data within the play interval are reproduced.

According to a further embodiment of the present invention, there is provided a program which includes steps similar to those of the information processing method described above.

In the following, an embodiment of the present invention is described with reference to the drawings.

Figure 1A:
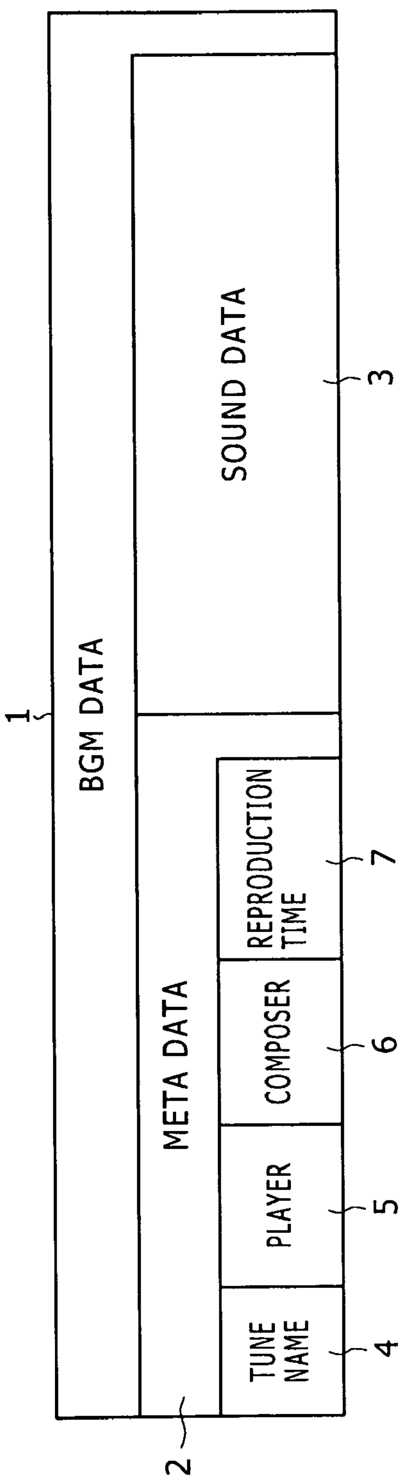
FIGS. 1A and 1B are diagrammatic views illustrating a configuration of BGM data and a storage area for storing the BGM data, respectively.
Figure 1B:
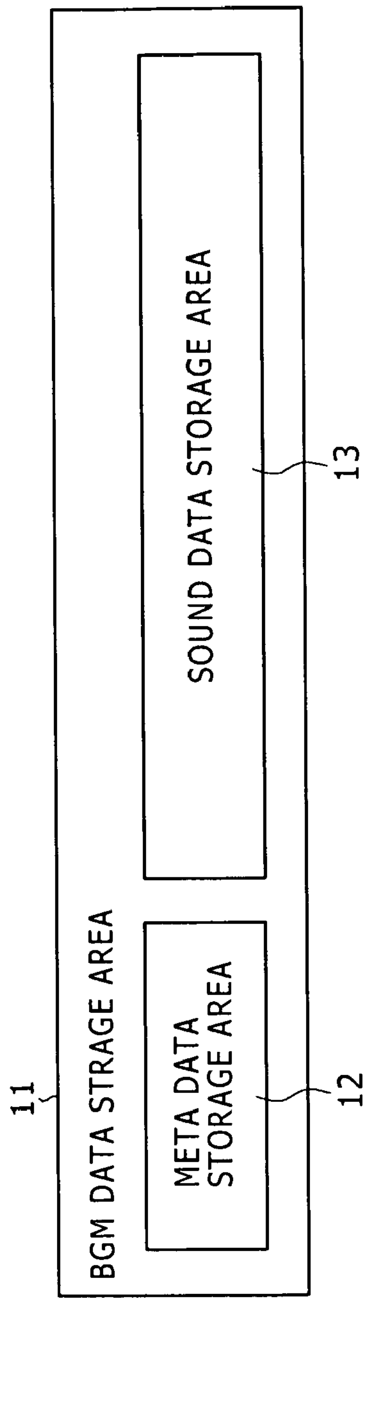
Figure 2:
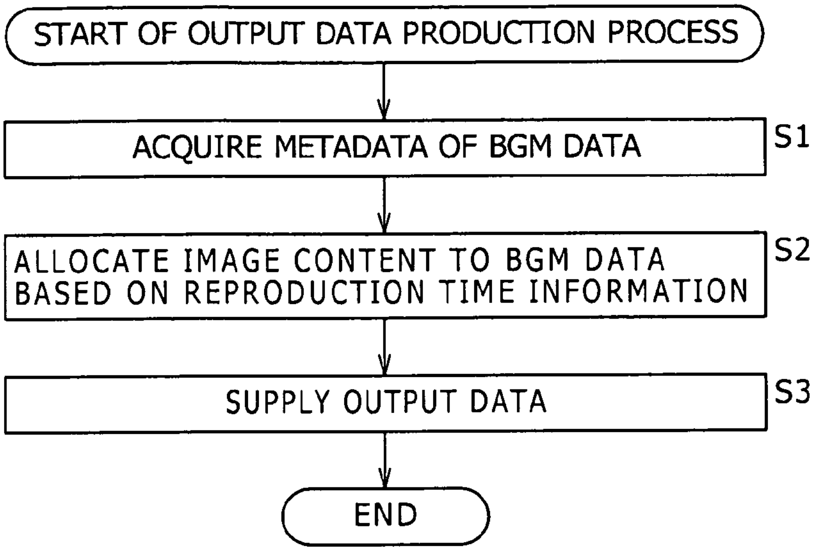
FIG. 2 is a flow chart illustrating a conventional output data production process.
Figure 3:
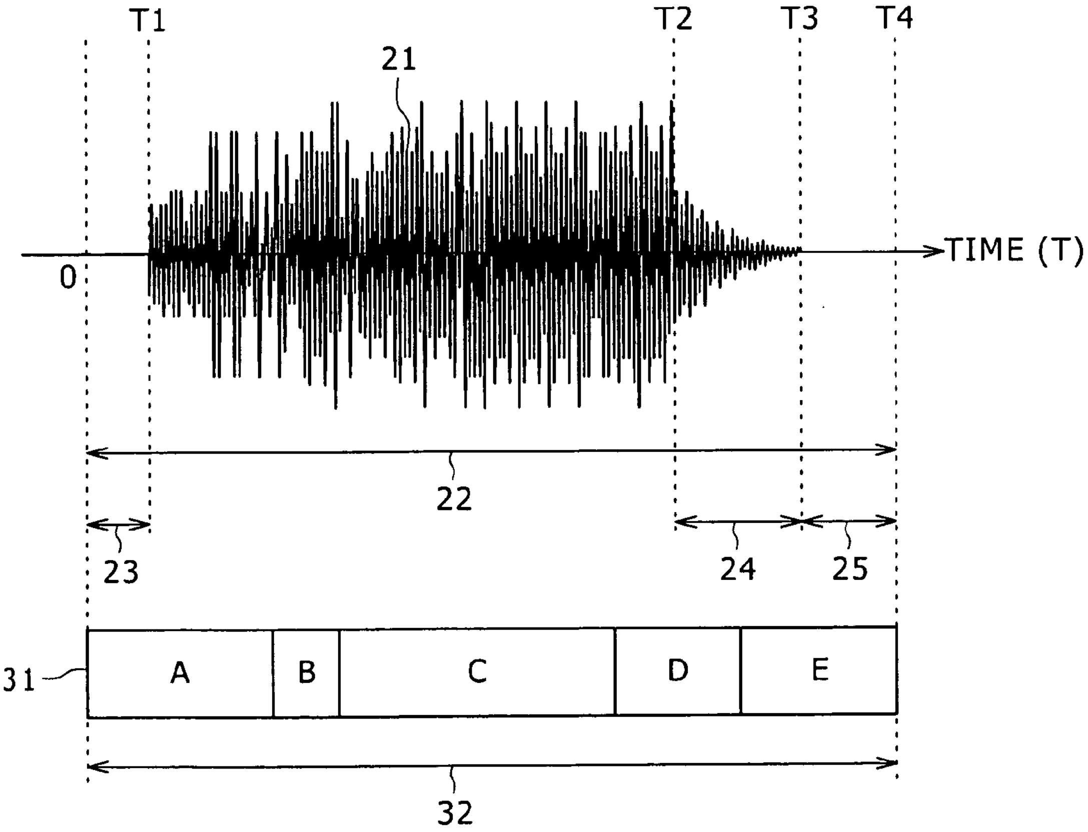
FIG. 3 is a diagram illustrating a conventional allocation method of an image content to a sound content.
Figure 4:
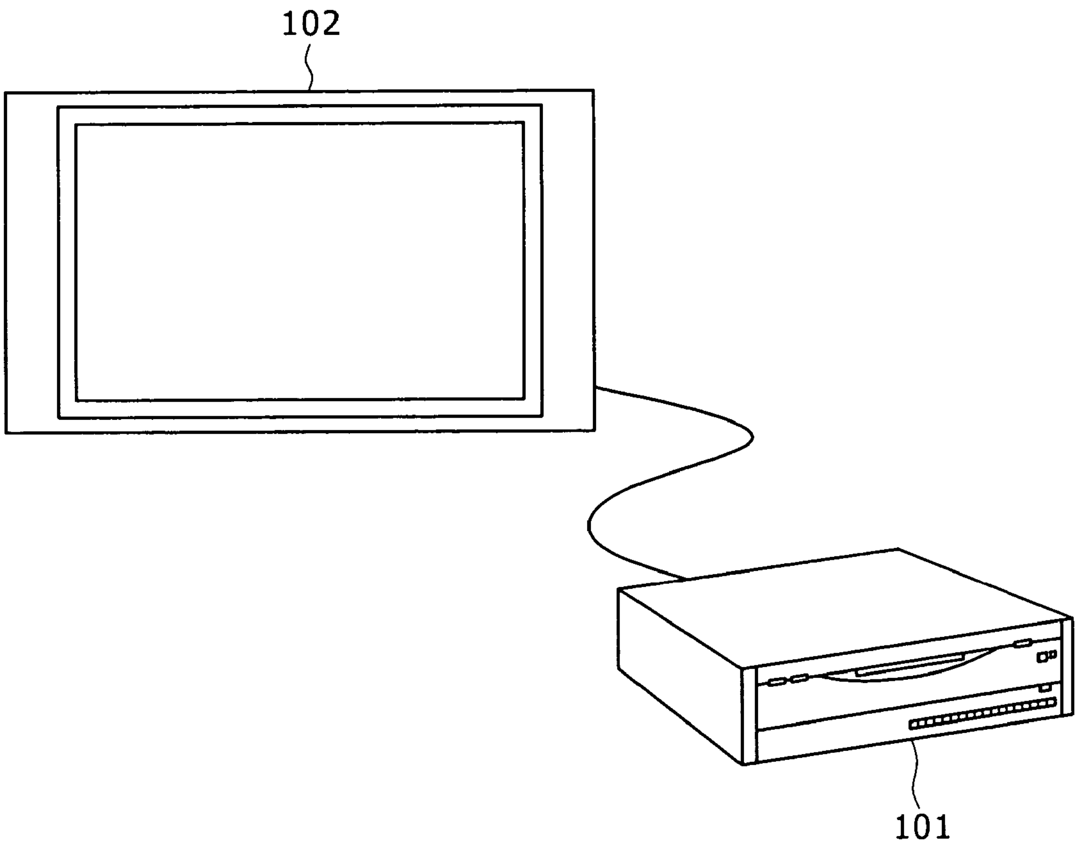
FIG. 4 is a schematic view showing an example of an appearance of an information processing apparatus to which the present invention is applied and a television receiver.

FIG. 4 shows an example of an appearance of an information processing apparatus 101 to which the present invention is applied and a television receiver 102 (referred to the the TV102 hereinafter) connected to the information processing apparatus 101 through a cable.

The information processing apparatus 101 has a function for fetching still pictures picked up by a digital camera or the like into a built-in HDD (Hard Disk Drive) through a memory card, a USB (Universal Serial Bus) cable or the like and displaying the still pictures on the TV102. The information processing apparatus 101 performs slideshow for automatically and successively displaying (without depending upon any operation of the user) still pictures to which various effects are applied while a tune selected by the user is being played as BGM.

Figure 5A:
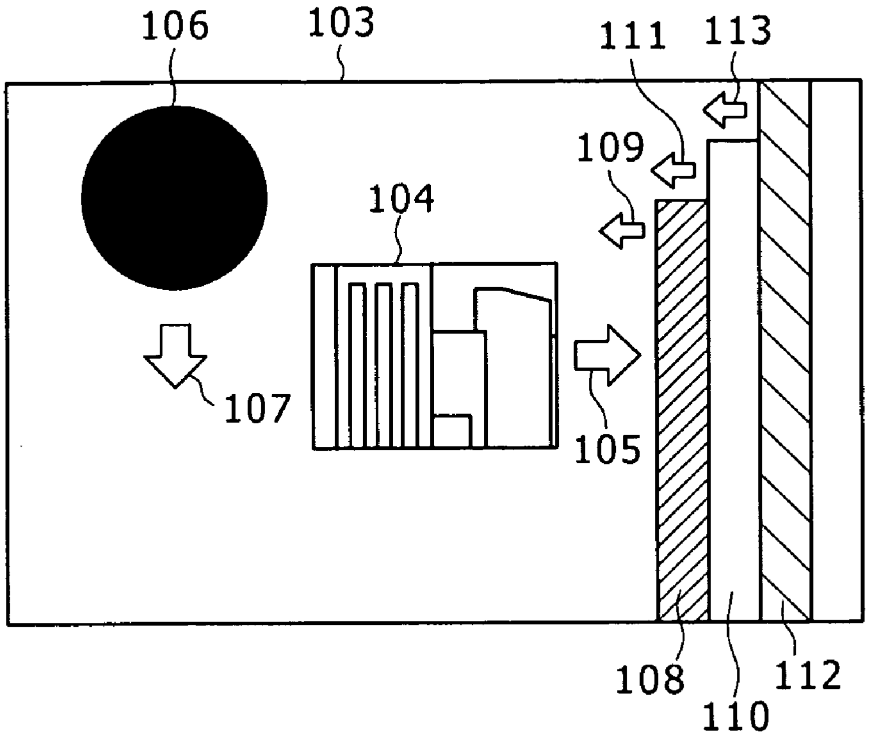
FIGS. 5A and 5B are views illustrating an example of an effect.
Figure 5B:
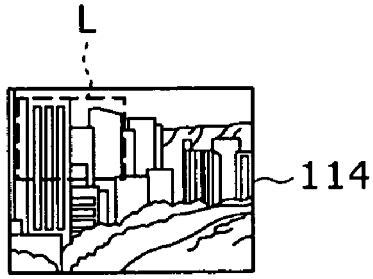

FIGS. 5A and 5B are views showing an example of an effect to be applied to a still picture. As seen in FIG. 5A, a frame image 103 after the effect is applied to the still picture is formed from a still picture 104 and other effect images.

In FIG. 5A, the still picture 104 is provided by the user such as a photograph image picked up by a digital camera. As shown in FIG. 5A, the image size of the still picture 104 is smaller than that of the frame image 103. Further, by successively displaying a plurality of frame images 103 as moving pictures, the still picture 104 apparently moves in a widthwise direction from the left to the right as indicated by an arrow mark 105 in the frame image 3.

Further, in the frame image 103, together with the still picture 104, a circular object 106 and rectangular objects 108, 110 and 112 are displayed as effects. By successively displaying a plurality of frame images 103 as moving pictures, the circular object 106 apparently moves in a vertical direction from an upper portion to a lower portion as indicated by an arrow mark 107 in the frame image 103. The rectangular objects 108, 110 and 112 are positioned adjacent each other, and apparently move, by successively displaying the plural frame images 103 as moving pictures, in a widthwise direction from the right to the left as indicated by arrow marks 109, 111 and 113, respectively, in the frame image 103.

Such a representation for one or several still pictures 104 as described above is hereinafter referred to as effect. Normally, an effect is a representation for displaying a set of still pictures for a period of time of several seconds. For example, the display size, shape and movement of the still picture 104 and the size, shape, movement and color of an object to be displayed together with the still picture 104 are different among different effects. Normally, a slideshow is a content for approximately several minutes formed from a plurality of effects. In particular, the total time period of reproduction time period of each effect reproduced as a slideshow is the reproduction time period of a slideshow.

In this manner, by displaying a group of still pictures while they are represented as a slideshow, the information processing apparatus 101 can enhance the amusement property of the group of still pictures and the degree of satisfaction of the user who enjoys the slideshow.

It is to be noted that the still picture 104 shown in FIG. 5A may be a provided photographed image itself which is not processed or a reduced image of the photographed image or else such a partial image L of the photographed image 114 as shown in FIG. 5B.

When such a still picture 104 as described above is to be prepared, the information processing apparatus 101 makes the output time period of sound and the display time period of images coincide with each other so as to raise the completeness of the slideshow content. Further, the information processing apparatus 101 specifies a characteristic interval of the tune and adds an image process suitable for the characteristic to images allocated to the interval.

In this manner, a content (hereinafter referred to suitably as slideshow content) which implements a slideshow with BGM for automatically and successively displaying still pictures to which various effects are applied while a selected tune is played as BGM is produced by the user performing various selections in accordance with a wizard displayed on the TV102.

For example, the user can produce a slideshow content (actually a "play list" as hereinafter described) principally by two operations including an operation for selecting a photo album (a folder in which a still picture file is stored) in which still pictures to be reproduced by slideshow are stored and another operation for selecting a tune to be played as BGM.

In particular, in the information processing apparatus 101, for example, a predetermined number of tunes which can be utilized as BGM are stored in the built-in HDD, and effects for representing atmospheres matching with those of the tunes are coordinated with the tunes. The substance of each effect is set so as to match with the atmosphere of the tune depending upon, for example, the tempo, the genre or the like of the tune.

Accordingly, when a slideshow content is produced, only if the user selects a favorite tune to be played as BGM, then also an effect matching with an atmosphere of the selected tune can be selected.

Further, only if the user selects a photo album without selecting the still pictures to be reproduced one by one, then all of still pictures stored in the photo album can be selected as still pictures of a reproduction object.

For example, where the reproduction time period required when all of the still pictures stored in the photo album selected by the user are reproduced is different from the time period for reproduction of the tunes of BGM one time, the information processing apparatus 101 automatically performs an adjustment process and so forth for adjusting the number of still pictures to be used as a reproduction object such as sampling out, repetitive displaying or the like of the still pictures stored in the photo album so that the reproduction time period of the still pictures and the reproduction time period of the tunes are substantially equal to each other.

Further, the information processing apparatus 101 performs scaling of the reproduction time period of a selected effect in order to make the reproduction time periods of an image and sound coincide with each other as described hereinabove.

Consequently, only it is necessary for the user to merely select a photo album in which still pictures to be reproduced are stored without being conscious of the number of still pictures stored in one photo album, the reproduction time of a tune of BGM and so forth.

Figure 6:
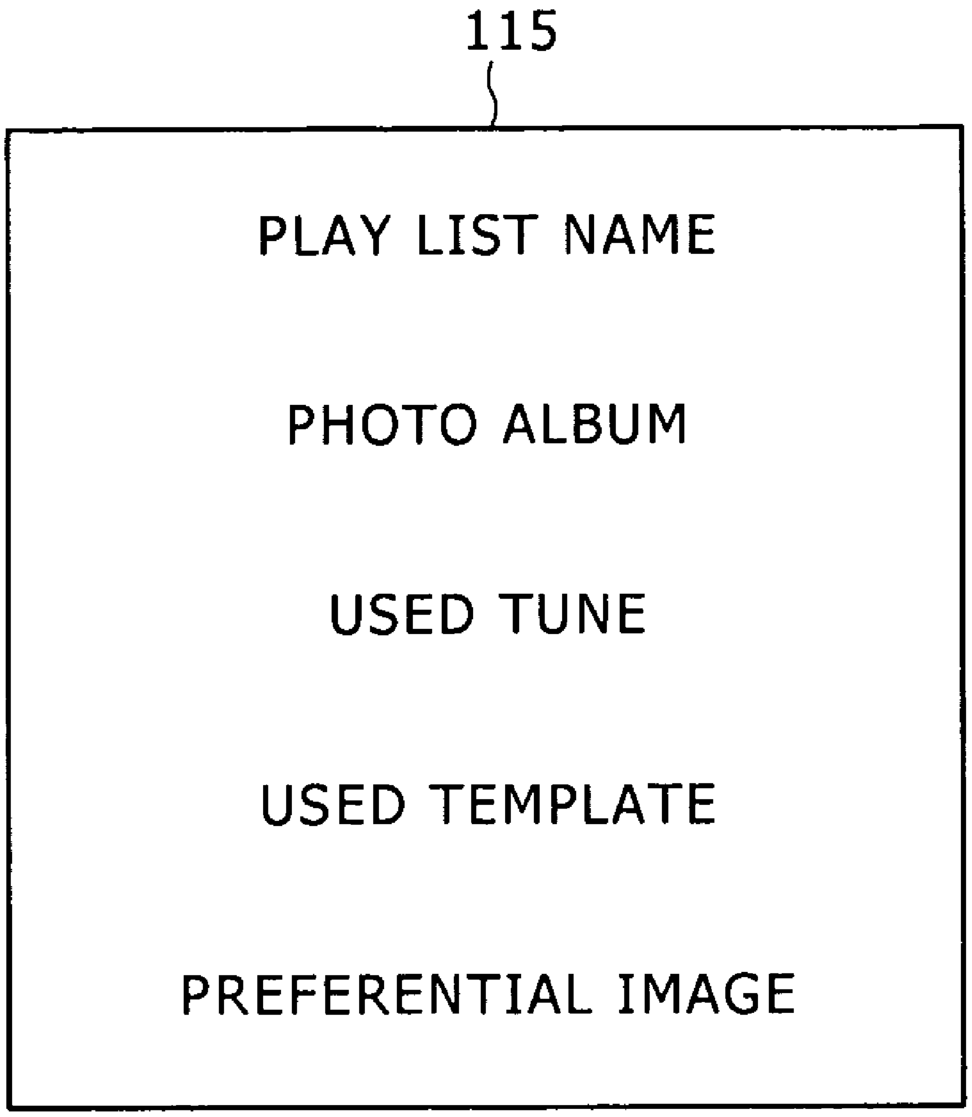
FIG. 6 is a view showing an example of a play list.

In response to such selection of the user as described above (selection of a photo album and a tune of BGM), the information processing apparatus 101 produces such a play list 115 as shown in FIG. 6.

When the user selects a certain play list 115, a photo album and a tune of BGM which are objects of the play list 115 are read out, and still pictures stored in the photo album are reproduced in accordance with a reproduction procedure defined by the play list 115. At this time, also the read out tune is reproduced as BGM. In this manner, the play list 115 is information which defines a reproduction procedure of still pictures for producing a slideshow content.

Here, the substance of description of the play list 115 is described.

Referring to FIG. 6, for example, "play list name", "photo album", "used tune", "used template" and "preferential image" are described in the play list 115.

The "play list name" is a title of the play list 115 and is set by the user as occasion demands.

The "photo album" is information which designates a photo album into which still pictures of an object of reproduction are to be stored. When a play list 115 is selected by the user, a photo album designated by the "Photo album" of the selected play list 115 is read out from the HDD, and the still pictures stored in the photo album are reproduced (displayed).

The "used tune" is information which designates a tune of BGM. When a play list 115 is selected by the user, a tune designated by the "used tune" of the selected play list is read out from the HDD and reproduced as BGM.

Figure 7:
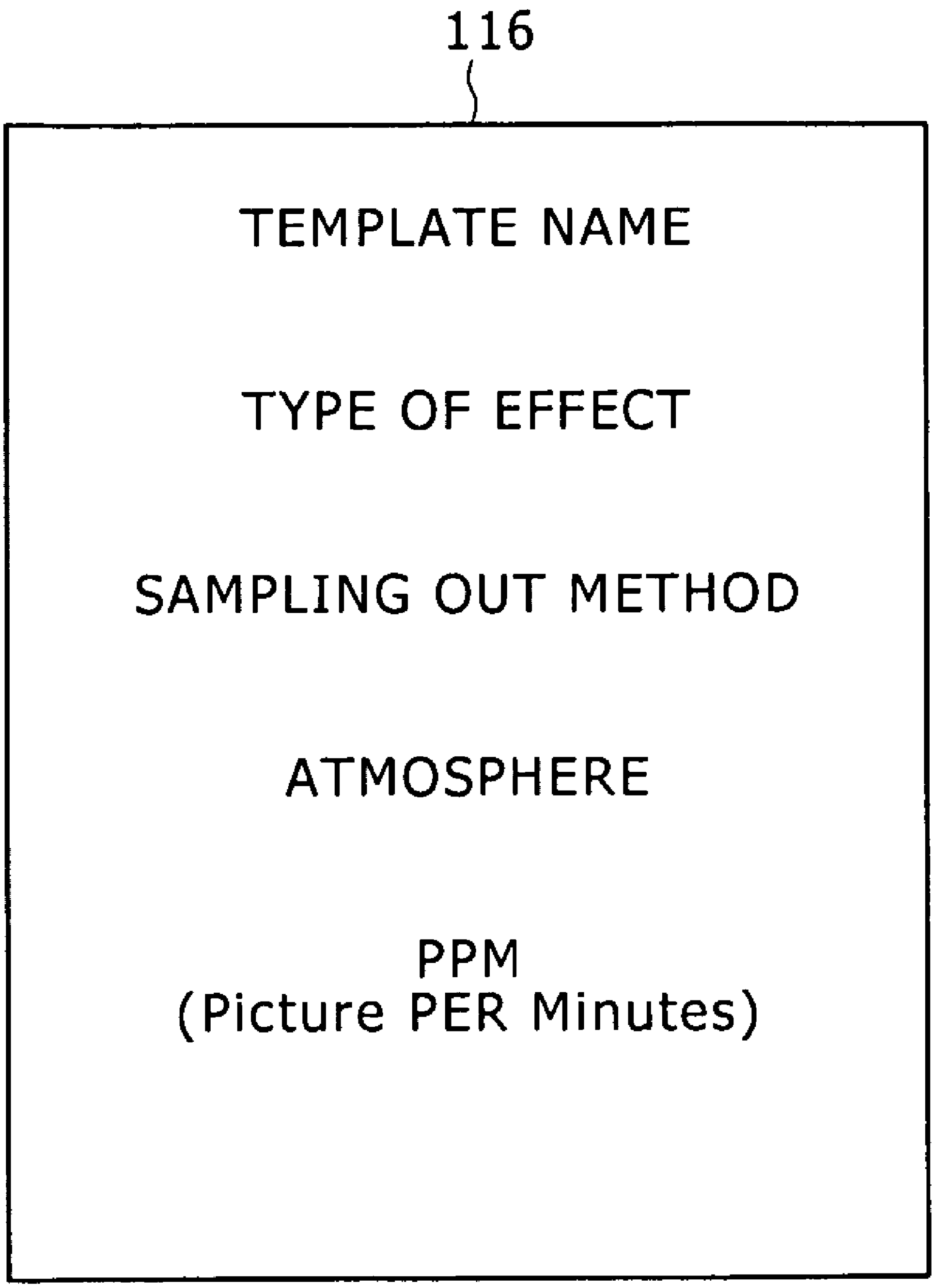
FIG. 7 is a view showing an example of a template.

The "used template" is coordinated with a tune designated by the "used tune" and is information which designates a template in which the substance of an effect and so forth are described (for example, "template name" of FIG. 7). When a play list 115 is selected by the user, a template designated by the "used template" of the selected play list 115 is read out from the HDD, and an effect of the substance described in the template is applied to the still pictures of a reproduction object. The template is hereinafter described with reference to FIG. 7.

The "preferential image" is information which designates a still picture to be displayed preferentially from among still pictures stored in a photo album designated by the "photo album". Where a great number of still pictures are stored in a photo album, some of them are occasionally sampled out in accordance with the reproduction time of the tune of BGM as described hereinabove. However, a still picture designated by the "preferential image" is not made an object of the sampling out but is selected as a still picture of an object of reproduction preferentially to the other still pictures. The designation of the "preferential picture" may be performed automatically by the information processing apparatus 101 or may be designated by the user itself.

FIG. 7 shows an example of description of a template.

Referring to FIG. 7, for example, "template name", "type of effect", "sampling out method, "atmosphere" and "PPM (Picture Per Minutes)" are described in the template 116.

The "template name" is the title of the template 116.

The "type of effect" is information which designates candidates for a type (substance) of an effect to be applied to still pictures of an object of reproduction. A plurality of sub effects are prepared in advance which represent, for example, which part of one still picture should be displayed, which part of the entire screen should be displayed, what size should be used for the display, and in what direction a movement should be performed, and the substance of one effect is determined by a combination of sub effects in accordance with the tempo and so forth of a tune with which the template 116 is coordinated. The combination of sub effects or the like is designated by the "type of effect" of the template 116. In other words, the "type of effect" is a list of candidates for the effect to be utilized when slideshow is performed in accordance with the template 116, and usually, a plurality of candidates are listed up. Then, an arbitrary one of the effects included in the list is utilized for the slideshow.

The "sampling out method" is information which designates a method to be used to sample out still pictures stored in a photo album. The "sampling out method" is actually used to adjust the reproduction time of the still pictures and the reproduction time of a tune of BGM so as to be substantially equal to each other. It is to be noted that the information processing apparatus 101 may be configured otherwise such that the user can set on/off of the sampling out of still pictures. When the sampling out of still pictures is off (when sampling out is not performed), all of the still pictures stored in a photo album designated by the "photo album" of the play list 115 are determined as still pictures of an object of reproduction.

The "atmosphere" is information representative of an atmosphere represented where still pictures are reproduced in accordance with the template 116.

The "PPM" is information which designates the number of still pictures to be reproduced (displayed) for one minute. The information processing apparatus 101 reproduces each of still pictures of an object of reproduction for a period of time designated by the "PPM".

Figure 8:
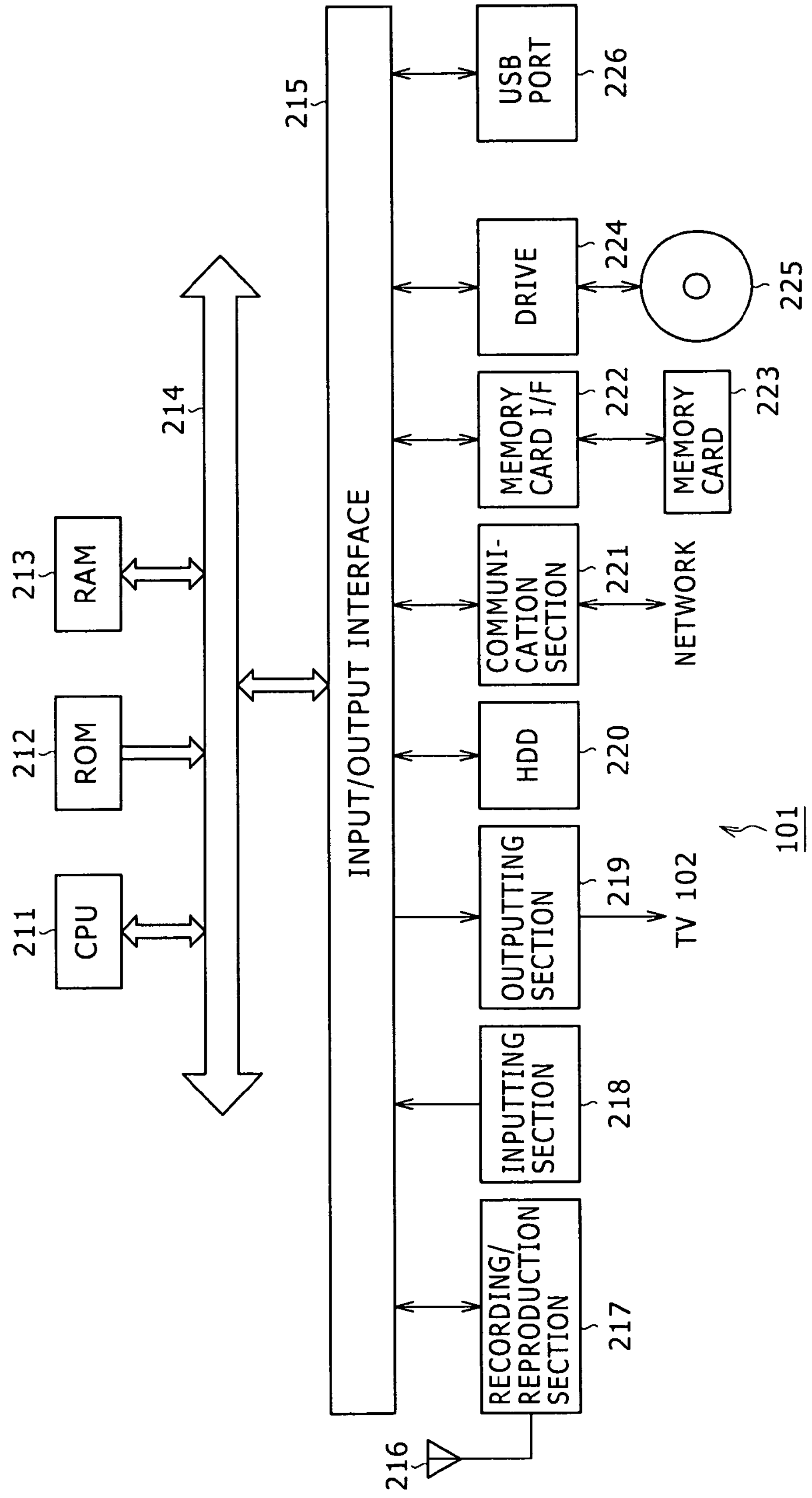
FIG. 8 is a block diagram showing an example of a configuration of the information processing apparatus.

FIG. 8 shows an example of a configuration of the information processing apparatus 101 of FIG. 4.

Referring to FIG. 8, a CPU (Central Processing Unit) 211 executes various processes in accordance with a program stored in a ROM (Read Only Memory) 212 or a program loaded from a HDD (Hard Disk Drive) 220 into a RAM (Random Access Memory) 213. Also data necessary for the CPU 211 to execute the processes are suitably stored into the RAM 213.

The CPU 211, ROM 212 and RAM 213 are connected to one another by a bus 214. Also an input/output interface 215 is connected to the bus 214.

A recording/reproduction section 217, an inputting section 218, an outputting section 219, a HDD 220, a communication section 221, a memory card I/F (InterFace) 222, a drive 224 and a USB port 226 are connected to an input/output interface 215.

The recording/reproduction section 217 compresses television program data acquired from a signal supplied thereto from an antenna 216 in accordance with, for example, the MPEG (Moving Picture Experts Group) 2 method and supplies the data (video content) obtained by the compression to the HDD 220 through the input/output interface 215 so as to be stored into the HDD 220. Further, the recording/reproduction section 217 decompresses a video content stored in the HDD 220 and outputs resulting image data of a television program from the outputting section 219 to the TV102. In short, the information processing apparatus 101 has a function of recording and reproducing a television program.

The inputting section 218 is formed from, for example, a reception element of infrared rays. The inputting section 218 receives a signal from a remote controller not shown and outputs information representative of the substance of an operation of a user to the CPU 211.

The outputting section 219 converts image data supplied thereto through the input/output interface 215 into an analog signal and outputs a resulting image signal to the TV102 through a cable. To the outputting section 219, for example, image data obtained by reproduction of a still picture in accordance with a play list, image data of a video content reproduced by the recording/reproduction section 217 or like data are supplied. Further, the outputting section 219 converts tune data supplied thereto through the input/output interface 215 into an analog signal and outputs the resulting signal to the TV102.

The HDD 220 stores a video content obtained by the recording/reproduction section 217, a still picture fetched from a memory card 223 through the memory card I/F 222, a still picture fetched from a digital camera through the USB port 226 and a USB cable and tune data (audio content) fetched from an optical disk 225 by the drive 224 and compressed in accordance with the MP3 (MPEG Audio Layer-3) method or the like.

The HDD 220 further stores play lists produced through selection by the user, data of tunes of BGM, templates coordinated with the tunes of BGM, slideshow contents and so forth.

The communication section 221 performs a communication process through a network.

The memory card I/F 222 reads out data stored in the memory card 223 loaded in a memory card slot formed in a housing of the information processing apparatus 101 and stores the read out data into the HDD 220 or the like. For example, data of a still picture are fetched into the information processing apparatus 1 through the memory card 223.

The drive 124 drives the optical disk 225 loaded therein to perform reading out of data stored on the optical disk 225 and writing of data on the optical disk 225. The optical disk 225 is a CD (Compact Disk), a DVD (Digital Versatile Disk) or the like, and data of a still picture, an audio content, a video content or the like are fetched into the information processing apparatus 101 from the optical disk 225. Further, the drive 224 suitably writes a produced slideshow content on the optical disk 225.

It is to be noted that the information processing apparatus 101 has a function also as a game machine. Also an image of a game (program) read out from the optical disk 225 by the drive 224 is supplied to the outputting section 219 through the input/output interface 215 and outputted to the TV102.

The USB port 226 performs communication with an external apparatus such as a digital camera through the USB cable to store a fetched still picture (image data) into the HDD 220.

Figure 9:
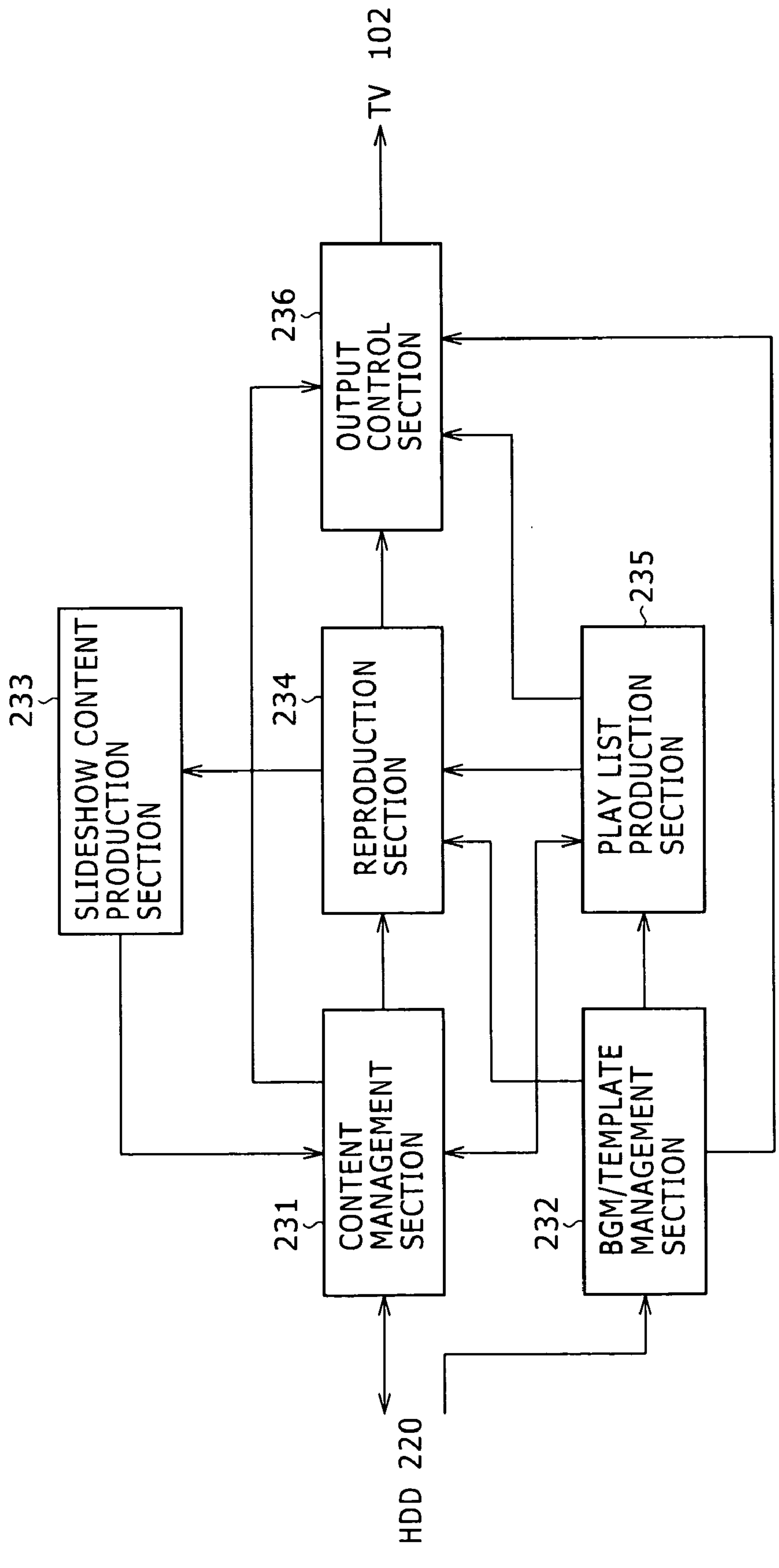
FIG. 9 is a block diagram showing an example of a functional configuration of the information processing apparatus.

FIG. 9 shows a functional configuration of the information processing apparatus 101. At least some of the various functional sections shown in FIG. 9 are implemented by a predetermined program executed by the CPU 211 of FIG. 8.

The information processing apparatus 101 includes a content management section 231, a BGM/template management section 232, a slideshow content production section 233, a reproduction section 234, a play list production section 235 and a output control section 236.

The content management section 231 manages various contents such as still pictures, video contents, audio contents and play lists stored in the HDD 220. Information of the contents managed by the content management section 231 is outputted to the output control section 236 and used for display of a menu screen hereinafter described.

The content management section 231 supplies, upon production of a play list, information of the title of a photo album selected by the user to the play list production section 235. Upon reproduction of a play list, the content management section 231 reads out a photo album which is a reproduction object of the play list (photo album designated by the "photo album" of the play list) from the HDD 220 and outputs the photo album to the reproduction section 234. Further, the content management section 231 stores a slideshow content produced by the slideshow content production section 233 and supplied thereto into the HDD 220.

The BGM/template management section 232 manages the tunes of BGM and the templates in a coordinated relationship with each other and stores them into the HDD 220. Upon production of a play list, the BGM/template management section 232 outputs information of the tunes of BGM managed thereby to the output control section 236 and outputs the information of a tune of BGM selected by the user and a template coordinated with the tune to the play list production section 235. On the other hand, upon reproduction of a play list, the BGM/template management section 232 outputs a template designated by the "used template" of the play list and a tune of BGM designated by the "used tune" to the reproduction section 234.

The slideshow content production section 233 acquires output vector data equivalent to a reproduction result of the reproduction section 234 (an array of a plurality of still pictures reproduced successively in accordance with a play list) from the reproduction section 234 and adds information necessary for a title and so forth to the output vector data to produce a slideshow content completed as a content. The slideshow content produced by the slideshow content production section 233 is outputted to the content management section 231 and stored into the HDD 220.

When an instruction to reproduce a play list is issued, the reproduction section 234 acquires the play list which is an object of the reproduction instruction issued, a photo album of the play list designated by the "photo album" and a tune of BGM designated by the "used tune" to perform reproduction of the play list. Further, the reproduction section 234 supplies output vector data equivalent to output data in accordance with a request from the slideshow content production section 233 to the slideshow content production section 233. A detailed configuration of the reproduction section 234 is described below with reference to FIG. 10.

The play list production section 235 produces such a play list as shown in FIG. 6 which describes information of a photo album selected by the user, information of a tune of BGM selected by the user, information of a template coordinated with the tune and so forth and outputs the produced play list to the content management section 231 or the reproduction section 234. Information of the photo album selected by the user during production of a play list is received from the content management section 231, and the information of the tune of BGM and the information of the template coordinated with the tune are received from the BGM/template management section 232.

The output control section 236 produces a screen (wizard screen) for guiding a production procedure of a play list to the user or a menu screen to be used as a start screen for operations to be executed using the information processing apparatus 101 based on information supplied thereto from the content management section 231, BGM/template management section 232 and reproduction section 234 and controls the TV102 to display the wizard screen or the menu screen.

FIG. 10 shows an example of a detailed configuration of the reproduction section 234.

Referring to FIG. 10, the reproduction section 234 includes a play list reproduction control section 241, an output vector data production section 242, a slideshow content reproduction control section 243, a BGM reproduction section 244, an extraction section 245, an effect image processing section 246, an internal memory 247 and a decoding processing section 249.

When a play list whose reproduction instruction is issued by the user is received from the content management section 231, the play list reproduction control section 241 analyzes the play list and supplies information necessary for production of output vector data to the output vector data production section 242.

The output vector data production section 242 acquires, based on the information (information of the play list, a template and so forth) supplied thereto from the play list reproduction control section 241, effect data, information regarding a photo album (photo album information), BGM data and so forth through the content management section 231 or the BGM template management section 232 as occasion demands. Then, the output vector data production section 242 produces output vector data which are data of the vector format of a slideshow file to be outputted. In other words, the output vector data production section 242 produces data of the vector format (output vector data) which is equivalent to a slideshow to be outputted and is formed as information of the vector format wherein it is represented as a set of parameters of equations of coordinates of points or lines or planes which interconnect the points, plotting information such as painting up, a special effect or the like.

As described hereinabove, in the play list, BGM, a photo album, effect candidates and so forth are merely selected, but it is not particularly designates an effect to be applied to any of still pictures of the photo album or an order in which the still pictures are to be displayed. The output vector data production section 242 determines a particular substance of the slideshow file by producing such output vector data as described above.

In short, the output vector data production section 242 acquires, based on the information of the play list, BGM data, information regarding the substance of a photo album (photo album information) and effect data, selects, from among still pictures belonging to the photo album, those still pictures to be displayed as a slideshow, selects effects to be applied to the selected still pictures, determines an order in which the still pictures are to be outputted, combines effect data in the form of data of the vector format based on the available information, and adds the information relating to the BGM and the still pictures to produce output vector data.

At this time, the output vector data production section 242 performs allocation of an image content (still pictures to which effects are applied) in response to the tune of the BGM by making the playing time of the BGM and the displaying time of the image content coincide with each other and applying an image process to a characteristic portion of the BGM in accordance with the characteristic of the BGM to produce output vector data. In particular, the output vector data production section 242 specifies the play interval which is a portion of the BGM within which sound of the reproduced sound data exists and allocates the image content (image data and effect data) to the play interval to produce reproduction control information (output vector data) for controlling the reproduction of the sound content and the image content so that the image content may be reproduced only within the play interval within which the sound content is reproduced (the image content may not be reproduced within any no-sound interval).

The output vector data production section 242 supplies the produced output vector data to the BGM reproduction section 244, extraction section 245 and effect image processing section 246.

When the slideshow content designated by the user, that is, output vector data, are received from the content management section 231, the slideshow content reproduction control section 243 supplies the slideshow content (output vector data) to the BGM reproduction section 244, extraction section 245 and effect image processing section 246 to control reproduction of the slideshow content. The slideshow content is a content completed as a slideshow and is formed from data of the vector format. In other words, the slideshow content is the output vector data described above stored as a content (with necessary information added thereto).

The BGM reproduction section 244 acquires a tune of BGM from the BGM/template management section 232 based on the output vector data supplied thereto from the output vector data production section 242 or the slideshow content reproduction control section 243, reproduces the acquired tune data and supplies the reproduced tune data to the effect image processing section 246.

The extraction section 245 performs sampling out or the like of still pictures stored in a photo album supplied thereto from the content management section 231 in accordance with the output vector data supplied thereto from the output vector data production section 242 or the slideshow content reproduction control section 243 to extract still pictures of an object of reproduction. By the sampling out process, the reproduction time period of still pictures is adjusted so as to be substantially equal to the reproduction time period of the BGM. Each still picture extracted by the extraction section 245 is supplied as a still picture of an object of reproduction to the effect image processing section 246.

It is to be noted that, if the sampling out process is set inoperative, then the extraction section 245 does not perform the sampling out process of still pictures but supplies all still pictures stored in the photo album supplied thereto from the content management section 231 as still pictures of an object of reproduction to the internal memory 247 so as to be stored into the internal memory 247.

The effect image processing section 246 acquires still pictures of an object of reproduction (still pictures of image data decoded as hereinafter described) supplied thereto from the output vector data production section 242 or the slideshow content reproduction control section 243, applies an effect to the still pictures, and synchronizes the data of the still pictures (frame image data of the raster format), to which the effect is applied, with BGM data supplied thereto from the BGM reproduction section 244 and so forth to produce output data. Then, the effect image processing section 246 supplies the output data to the output control section 236. Further, the effect image processing section 246 supplies the used output vector data at a predetermined timing to the internal memory 247 so as to be stored into the internal memory 247.

The internal memory 247 is a memory area assured in the RAM 213 by a process executed by the CPU 211 of FIG. 8 and is utilized as a buffer memory for temporarily retaining still pictures (image data) of an object of reproduction, as a memory for temporarily storing the output vector data, and so forth. The output vector data are outputted to the slideshow content production section 233 as occasion demands.

The decoding processing section 249 acquires image data retained in the buffer of the internal memory 247 (encoded image data supplied from the extraction section 245 and stored in the internal memory 247) and performs a decoding process for the acquired image data in accordance with a method corresponding to the encoding method. After the decoding process is completed, the decoding processing section 249 stores the decoded image data into the buffer of the internal memory 247 again.

Reproduction of a play list by the reproduction section 234 which has such a configuration as described above is performed also when an instruction to perform preview reproduction of the play list being produced is issued by the user. When an instruction to perform preview reproduction of the play list is issued, the play list being produced is supplied from the play list production section 235 to the reproduction section 234, and reproduction of the play list is performed by the components shown in FIG. 10.

FIG. 11 shows an example of a detailed configuration of the output vector data production section 242 of FIG. 10.

Referring to FIG. 11, the output vector data production section 242 includes a BGM data acquisition section 251, a BGM data decompression section 252, a head no-sound interval detection section 253, a tail no-sound interval detection section 254, a tail fade-out interval detection section 255, and a play interval specification section 256. The output vector data production section 242 further includes a reproduction time details information analysis section 257, a photo album information acquisition section 258, an effect acquisition section 259, and an image content allocation section 260. The output vector data production section 242 further includes an additional image process setting addition section 261, a fade-out process setting section 262, a reproduction time details information storage control section 263 and an output vector data supply section 264.

The BGM data acquisition section 251 acquires BGM information which designates BGM of the play list and acquires BGM data from the HDD 220 based on the BGM information. The BGM data include at least sound data which are data of a sound material. The BGM data may further include meta data applied to the sound data. The BGM data are data of an arbitrary format determined in advance such as the linear PCM (Pulse Code Modulation), MP3 (MPEG (Moving Picture Experts Group) Audio Layer 3), AAC (Advanced Audio Codec), WMA (Windows (registered trademark) Media Audio) or the like.

The linear PCM is a non-compressing digitalization method wherein sound is measured and sampled at predetermined intervals of time. The MP3 is one of MPEG sound compression techniques and can compress sound of the CD quality (44.1 kHz, 16 bits, stereo) to approximately 1/10 so that no degradation on the auditory sense may appear. The AAC is one of sound compression methods which can be used in the MPEG-2 or the MPEG-4 and applies a technique of predicting later data to enhance the compression ratio. The WMA is one of sound compression formats of Microsoft and can utilize a content management system called Windows (registered trademark) Media Rights Manager to encrypt data.

The BGM data may be of any format only if the pertaining components of the information processing apparatus 101 can process the BGM data and, for example, may be compressed data or non-compressed data or may be digital data or analog data.

The BGM data acquisition section 251 temporarily stores the acquired BGM data into an internal memory not shown and causes the BGM data decompression section 252 to decompress the BGM data as occasion demands. Then, the BGM data acquisition section 251 supplies the BGM data to the head no-sound interval detection section 253, tail no-sound interval detection section 254, tail fade-out interval detection section 255 and reproduction time details information analysis section 257.

The BGM data decompression section 252 decompresses the BGM data acquired by the BGM data acquisition section 251 as occasion demands. In other words, where the BGM data acquired by the BGM data acquisition section 251 are compressed data, when the BGM data decompression section 252 acquires the compressed BGM data from the BGM data acquisition section 251, it decompresses the BGM data using a method corresponding to the compression method applied to the BGM data to produce non-compressed BGM data, and supplies the non-compressed BGM data to the BGM data acquisition section 251. It is to be noted that the BGM data decompression section 252 may be configured such that it is ready for a plurality of different compression methods and selects one of the decompression methods in accordance with the compression method of the BGM data to be decompressed and then decompresses the BGM data using the selected method.

The head no-sound interval detection section 253 analyzes sound data included in the non-compressed BGM data supplied thereto from the BGM data acquisition section 251 to detect a no-sound interval (interval within which the sound output level is 0) existing at the head in time of the sound. The head no-sound interval detection section 253 supplies the detected information to the play interval specification section 256.

The tail no-sound interval detection section 254 analyzes the sound data included in the non-compressed BGM data supplied thereto from the BGM data acquisition section 251 to detect a no-sound interval (interval within which the sound output level is 0) existing at the tail in time of the sound. The tail no-sound interval detection section 254 supplies the detected information to the tail fade-out interval detection section 255 and the play interval specification section 256.

Usually, in order to facilitate a recording process, an editing process or a reproduction process of a sound material, sound data include no-sound periods provided before and after in time of the sound material itself. In other words, the sound data include not only an interval wherein the output signal level is higher than 0 (that is, sound exists) but also an interval (that is, no-sound interval) within which the output signal level is 0 (no sound exists). The head no-sound interval detection section 253 detects, from between the no-sound periods, the no-sound period which exits prior in time to the sound material (at the head of the sound data), and the tail no-sound interval detection section 254 detects the no-sound period existing later in time than the sound material (at the tail end of the sound data).

The tail fade-out interval detection section 255 analyzes the sound data included in the non-compressed BGM data supplied thereto from the BGM data acquisition section 251 to detect a fade-out interval (tail fade-out interval) within which the output signal level of the sound data gradually decreases independently of the sound volume during the play until it finally becomes 0 and which succeeds the no-sound interval at the tail detected by the tail no-sound interval detection section 254.

In particular, the tail fade-out interval is an interval within which the sound data are processed such that the sound volume of the output data gradually decreases irrespective of the sound volume during the play until the sound volume reduces to 0 finally. Such fade-out as just described is one of sound processing methods and applies to the sound an effect of naturally connecting an interval within which the output signal level is not 0 (sound exists) (that is, a play interval) and another interval within which the output signal level is 0 (no sound exists) (that is, a no-sound interval) to each other.

The tail fade-out interval detection section 255 detects the tail fade-out interval in order to apply an effect suitable for the fade-out effect to the image content which corresponds to such a tail fade-out interval as described above. After the tail fade-out interval is detected, the tail fade-out interval detection section 255 supplies information of a result of the detection to the fade-out process setting section 262.

The play interval specification section 256 specifies an interval of the sound data included in the BGM data acquired by the BGM data acquisition section 251 other than the head no-sound interval detected by the head no-sound interval detection section 253 and the tail no-sound interval detected by the tail no-sound interval detection section 254 as a play interval. In other words, the play interval specification section 256 specifies an interval of the sound data within which the output signal level is higher than 0 (sound exists) as a play interval. The play interval specification section 256 supplies information regarding the specified play interval to the image content allocation section 260 so that the image content is allocated only to the sound existing interval (within which sound exists) of the sound data (so as to prevent the situation that the image content is allocated to any no-sound interval and an image is displayed in a no-sound condition.

The reproduction time details information analysis section 257 analyzes, if the meta data included in the BGM data acquired by the BGM data acquisition section 251 include reproduction time details information indicative of details of the reproduction time period such as the no-sound periods described above and a characteristic portion of the sound data, the reproduction time details information. The reproduction time details information analysis section 257 supplies a result of the analysis to the image content allocation section 260 and the fade-out process setting section 262.

The photo album information acquisition section 258 receives still picture information relating to the still pictures of the play list from the play list reproduction control section 241 and acquires photo album information, which is information regarding a photo album, from the HDD 220 based on the acquired still picture information. The photo album information includes, for example, the name of the photo album and a file name, a recording position, a data amount, a date of production, a summary and so forth of still pictures belonging to the photo album. Thus, the pertaining components of the information processing apparatus 101 can refer to the photo album information to specify the still pictures included in the photo album. The photo album information acquisition section 258 supplies the acquired photo album information to the image content allocation section 260.

It is to be noted that the photo album information acquisition section 258 may alternatively acquire data of the photo album (that is, image data of the still pictures) in place of the photo album information and supply the acquired data to the image content allocation section 260 or otherwise produce necessary information based on the acquired photo album and supply the information as photo album information to the image content allocation section 260.

The effect acquisition section 259 acquires effect information regarding effects from the play list reproduction control section 241 and acquires effect data from the HDD 220 based on the effect information. The effect data are data of the vector format which prescribe what image process should be applied to the allocated still pictures and when and how display images to be displayed should be displayed. In other words, the effect data are control information particularly indicating (designating) what effects should be applied to the still pictures. When the effect data are acquired, the effect acquisition section 259 supplies them to the image content allocation section 260.

The image content allocation section 260 allocates, based on the information regarding the play interval supplied thereto from the play interval specification section 256 or the result of analysis of the reproduction time details information supplied thereto from the reproduction time details information analysis section 257, the photo album information supplied thereto from the photo album information acquisition section 258 and the effect data supplied thereto from the effect acquisition section 259 as an image content to the play interval of the BGM data (sound data). In other words, the image content allocation section 260 sets the image content to be reproduced upon reproduction of sound data within the play interval, that is, what effect should be applied to each still picture when the still picture is displayed while a portion of the sound data within which sound exists is outputted.

Then, the image content allocation section 260 supplies vector data equivalent to the image content and the sound content after the allocation to the additional image process setting addition section 261.

The additional image process setting addition section 261 decides whether or not an additional image process should be performed for the image content after the allocation is completed with regard to the vector data supplied thereto from the image content allocation section 260. If the additional image process setting addition section 261 decides that an additional image should be performed, then it adds additional image processing setting to the vector data so that an additional image may be performed for the image content.

For example, an image content is formed from a plurality of effects joined together, and the additional image process setting addition section 261 can set any jointing portion between the effects such that an image processing effect called cross-fade for causing an image of an old effect image to fade out and causing an image of a new effect to fad in is applied additionally. Whether or not such additional image process setting should be added is decided, for example, based on an instruction of the user or the like. It is to be noted that such an additional image process may be any image process and naturally be an image process other than the cross-fade. For example, a fade-in process may be added to the head no-sound interval so that the image content is displayed such that the luminance increases gradually from a dark image to an ordinary image.

If the additional image process setting addition section 261 adds additional image process setting to the image content as occasion demands, then it supplies vector data of the additional image process setting to the fade-out process setting section 262.

The fade-out process setting section 262 sets so that, for the image content of the BGM data (sound data) allocated to the tail fade-out interval detected by the tail fade-out interval detection section 255, a fade-out process of fading out the display image may be performed as an image process suitable for the fade-out effect. In short, the fade-out process setting section 262 causes the fade-out effect to be reflected on the vector data.

It is to be noted that the fade-out process setting section 262 may use, in place of the information from the tail fade-out interval detection section 255, information regarding the tail fade-out interval included in the reproduction time details information analyzed by the reproduction time details information analysis section 257 to set so that a fade-out process of fading out the display image is applied as an image process suitable for the fade-out effect for the image content allocated to the tail fade-out interval. The fade-out process setting section 262 supplies the vector data to which the setting process is applied as occasion demands to the reproduction time details information storage control section 263.

The reproduction time details information storage control section 263 produces, from the vector data supplied thereto, reproduction time details information which is detailed information regarding the reproduction time period including information of the no-sound intervals, play interval, fade-out intervals and so forth and stores the produced reproduction time details information into the HDD 220 or the like. After the control process for the storage of the reproduction time details information is completed, the reproduction time details information storage control section 263 supplies the vector data to the output vector data supply section 264.

The output vector data supply section 264 temporarily stores the vector data supplied thereto and supplies the vector data as output vector data to the BGM reproduction section 244, extraction section 245 and effect image processing section 246 at an arbitrary timing.

The output vector data production section 242 having such a configuration as described above allocates, when it executes the output vector data production process to produce output vector data, the image content not to the reproduction interval from the head to the tail of the sound data but to the play interval within which sound exists and applies an image process such as a fade-out process or a cross-fade process to the image content as occasion demands (adds setting for applying the image process to the vector data). The output vector data production process executed by the output vector data production section 242 is described below with reference to flow charts of FIGS. 12 and 13.

Figure 12:
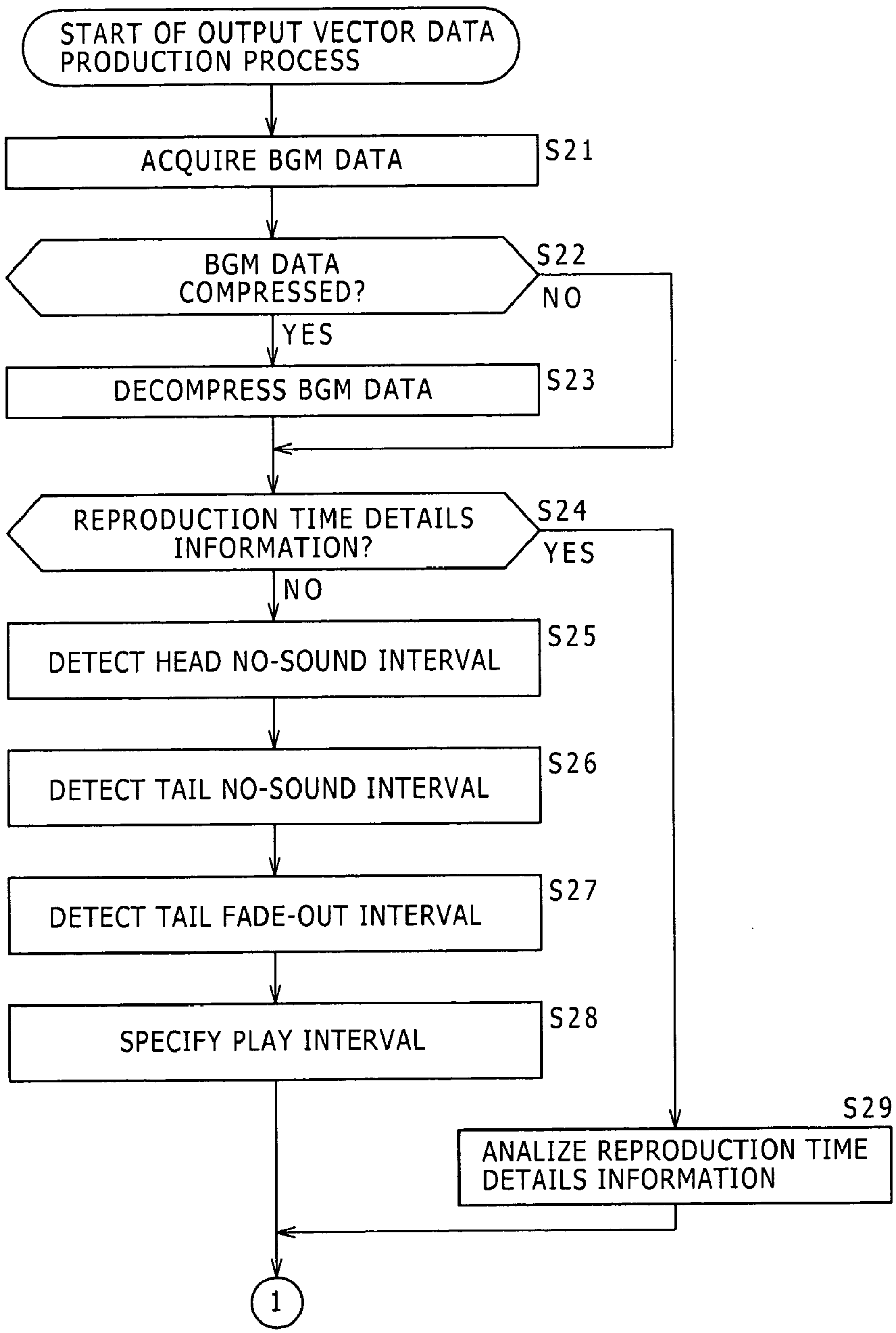
FIGS. 12 and 13 are flow charts illustrating an output vector data production process.

After the output vector data production process is started, the BGM data acquisition section 251 acquires BGM data based on the BGM information at step S21 of FIG. 12. At step S22, the BGM data acquisition section 251 refers to the meta data of the acquired BGM data to decide whether or not the BGM data are compressed data. If the BGM data acquisition section 251 decides that the BGM data are compressed data, then it supplies the BGM data to the BGM data decompression section 252 and advances the processing to step S23. At step S23, the BGM data decompression section 252 decompresses the BGM data supplied thereto in accordance with a method corresponding to the compression method of the BGM data and supplies the decompressed BGM data to the BGM data acquisition section 251, whereafter it advances the processing to step S24. On the other hand, if the BGM data acquisition section 251 decides at step S22 that the BGM data are not compressed data, then it advances the processing to step S24 while omitting the process at step S23.

At step S24, the BGM data acquisition section 251 refers to the meta data included in the acquired BGM data to decide whether or not the BGM data include reproduction time details information. If the BGM data acquisition section 251 decides that no reproduction time details information is included, then it supplies the BGM data to the head no-sound interval detection section 253, tail no-sound interval detection section 254 and tail fade-out interval detection section 255 and then advances the processing to step S25.

At step S25, the head no-sound interval detection section 253 detects the head no-sound interval of sound data included in the BGM data and supplies a result of the detection to the play interval specification section 256. At step S26, the head no-sound interval detection section 254 detects the tail no-sound interval of the sound data included in the BGM data and supplies a result of the detection to the tail fade-out interval detection section 255 and the play interval specification section 256. At step S27, the tail fade-out interval detection section 255 detects the tail fade-out interval of the sound data included in the BGM data and supplies a result of the detection to the fade-out process setting section 262. At step S28, the play interval specification 256 specifies a play interval of the sound data included in the BGM data based on the results of detection supplied thereto from the head no-sound interval detection section 253 and tail no-sound interval detection section 254 and supplies a result of the specification to the image content allocation section 260. Thereafter, the processing is advanced to step S31 of FIG. 13.

On the other hand, if the BGM data acquisition section 251 decides at step S24 of FIG. 12 that the BGM data include reproduction time details information, then it supplies the BGM data to the reproduction time details information analysis section 257 and the advances the processing to step S29.

At step S29, the reproduction time details information analysis section 257 having acquired the BGM data analyzes the reproduction time details information supplied thereto and supplies a result of the analysis to the image content allocation section 260 and the fade-out process setting section 262. Thereafter, the processing advances to step S31 of FIG. 13.

Figure 13:
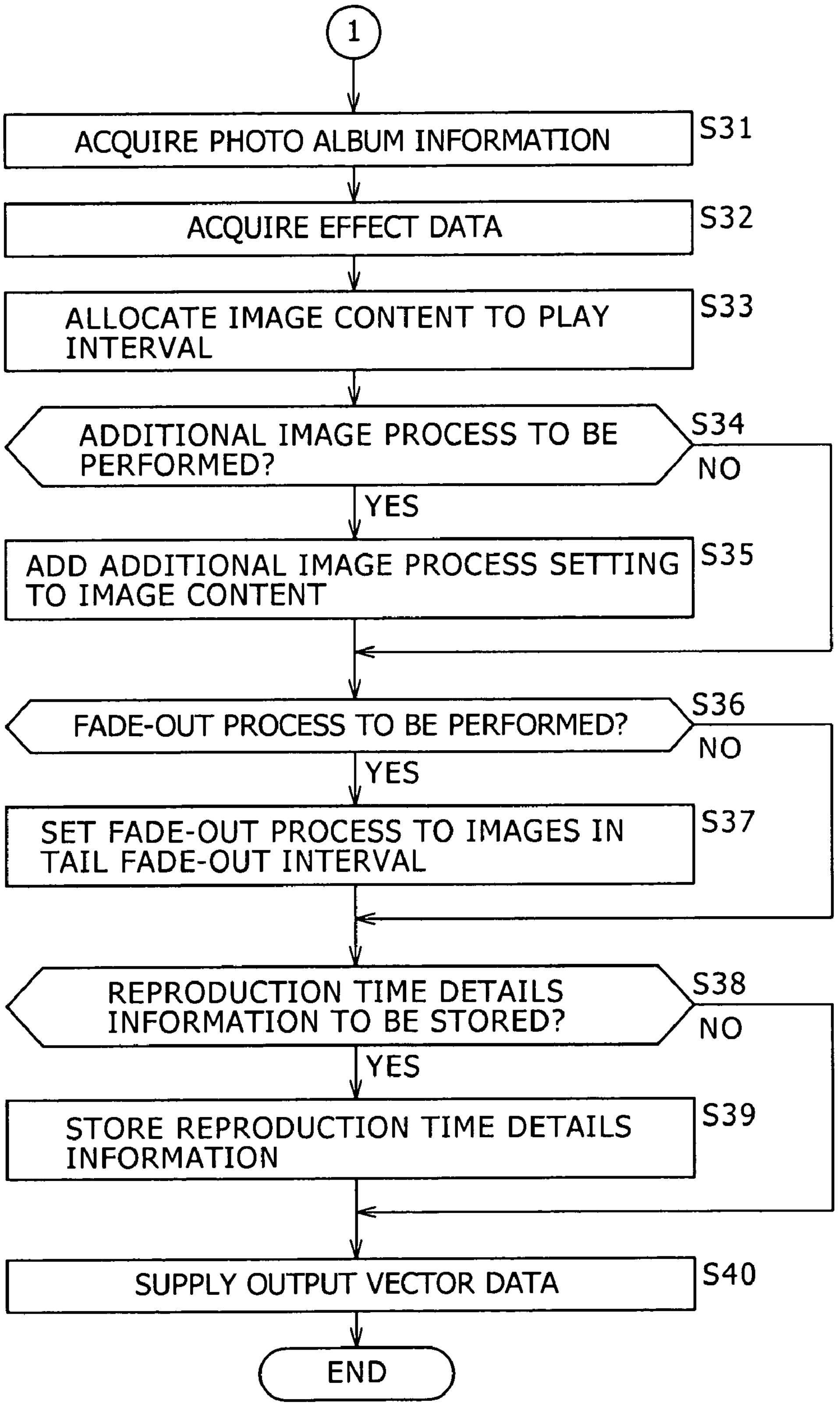

Referring now to FIG. 13, the photo album information acquisition section 258 acquires photo album information based on the still picture information at step S31. At step S32, the effect acquisition section 259 selects and acquires effect data based on the effect information. At step S33, the image content allocation section 260 allocates the photo album information supplied thereto from the photo album information acquisition section 258 and the effect data supplied thereto from the effect acquisition section 259 as an image content to the play interval specified by the play interval specification section 256.

It is to be noted that, at this time, the image content allocation section 260 may otherwise allocate, based on the result of analysis of the reproduction time details information analysis section 257, that is, based on information regarding the play interval included in the reproduction time details information, the photo album information supplied thereto from the photo album information acquisition section 258 and the effect data supplied thereto from the effect acquisition section 259 as an image content to the play interval.

At step S34, the additional image process setting addition section 261 decides whether or not an additional image process should be performed for the image content with regard to the vector data supplied thereto from the image content allocation section 260. If the additional image process setting addition section 261 decides that an additional image process should be performed, then the additional image process setting addition section 261 adds additional image processing setting to the image content at step S35. After the additional image process setting addition section 261 adds the additional image process setting, it advances the processing to step S36.

On the other hand, if the additional image process setting addition section 261 decides at step S34 that an additional image process should not be performed for the image content with regard to the vector data supplied thereto from the image content allocation section 260, then it omits the process at step S35 and advances the processing to step S36.

At step S36, the fade-out process setting section 262 decides whether or not a fade-out process should be performed for the vector data supplied thereto. If the fade-out process setting section 262 decides that a fade-out process should be performed, then it sets a fade-out process to images in the tail fade-out interval. After the setting of the fade-out process is completed, the fade-out process setting section 262 advances the processing to step S38.

On the other hand, if the fade-out process setting section 262 decides at step S36 that a fade-out process should not be performed, then it omits the process at step S37 and advances the processing to step S38.

At step S38, the reproduction time details information storage control section 263 decides whether or not the reproduction time details information corresponding to the vector data should be stored. If the reproduction time details information storage control section 263 decides that the reproduction time details information should be stored, then it advances the processing to step S39, at which it produces reproduction time details information from the vector data and stores the reproduction time details information into the HDD 220 or the like. After the reproduction time details information storage control section 263 stores the reproduction time details information, it supplies the vector data to the output vector data supply section 264 and then advances the processing to step S40.

On the other hand, if the reproduction time details information storage control section 263 decides that the reproduction time details information should not be stored, then it omits the process at step S39 and supplies the vector data to the output vector data supply section 264. Thereafter, the reproduction time details information storage control section 263 advances the processing to step S40.

At step S40, the output vector data supply section 264 supplies the vector data supplied thereto as output vector data to the pertaining sections.

After the supply of the output vector data comes to an end, the output vector data supply section 264 ends the output vector data production process.

Figure 14:
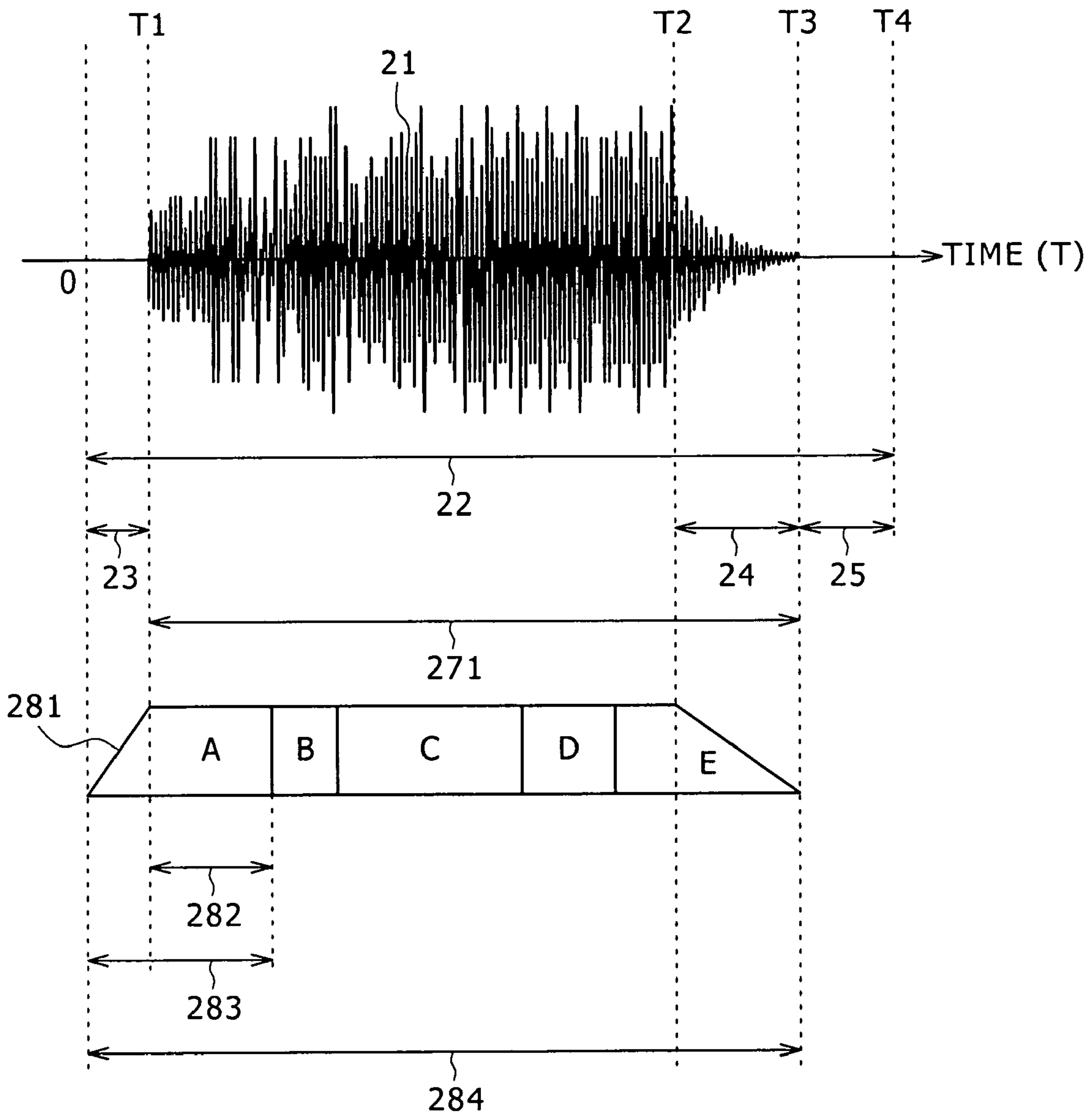
FIG. 14 is a diagram illustrating an allocation method of an image content to a sound content by the information processing apparatus of FIG. 4.

FIG. 14 illustrates a relationship between the reproduction time periods of the image content and the reproduction time periods of the sound content of the output data produced in such a manner as described above.

Referring to FIG. 14, an interval of a reproduction time period 22 (interval from time 0 to time T4) of a waveform 21 except a head no-sound interval 23 (interval from time 0 to time T1) and a tail no-sound interval 25 (interval from time T3 to time T4) makes a play interval 271 (interval from time T1 to time T3). The play interval 271 includes also a tail fade-out interval 24 (interval from time T2 to time T3). By the output vector data production process described above, an image content 281 is allocated to the play interval 271.

In the case illustrated in FIG. 14, the image content 281 is formed from effects A to E. In particular, according to the image content 281, still pictures to which the effect A is applied are displayed first, and then still pictures to which the effect B is applied are displayed. Thereafter, still pictures to which the effect C is applied are displayed, and still pictures to which the effect D is applied are displayed, whereafter still pictures to which the effect E is applied are displayed. In the output vector data production process described above, such an image content 281 as described above is allocated to the play interval 271. Further, a fade-out image process is applied to a portion of the image content 281 (portion of the effect E in FIG. 14) which is applied to the tail fade-out interval 24 within which the sound volume decreases gradually, and consequently, the image fades out in accordance with the BGM (the luminance decreases gradually so that the image gradually approaches the dark image). Further, in the image content, a fade-in process is applied as another additional image process to the head no-sound interval 23 so that a fade-in effect that the image of the effect A allocated to the interval immediately after the head no-sound interval 23 fades in (the luminance increases until the image gradually changes from the dark image to an ordinary image) is applied to the head no-sound interval 23. In other words, by the setting of the additional image process just described, the allocation interval of the effect A is changed from an interval 282 (interval beginning with time T1) to another interval 283 (interval beginning with time 0) including the head no-sound interval 23 (the display interval of the effect A changes from the interval 282 to the interval 283). Accordingly, by the processes described, the image content is finally allocated to an interval 284 (interval from time 0 to time T3).

Since the output vector data production process is performed to allocate an image content to a play interval within which sound exists in such a manner as described above, the information processing apparatus 101 can provide images whose reproduction time period coincides with that of BGM as a slideshow to the user. In other words, the information processing apparatus 101 can adjust, whatever length a tune designated as BGM has, the head end and the last end of the photograph slideshow with BGM in accordance with the music thereby to provide a high-quality slideshow having a high degree of completeness to the user. Consequently, the information processing apparatus 101 can enhance the degree of satisfaction of the user. In short, the information processing apparatus 101 can suppress such a situation that, of a photograph slideshow content with music, only sound is outputted or only an image is displayed.

Further, since the output vector data production section 242 detects the tail fade-out interval and applies a fade-out process to an image content allocated to the detected interval (adds setting for applying a fade-out process to vector data) or applies an additional image process to the image content (adds additional image process setting to the vector data), the information processing apparatus 101 can provide images which coincide in atmosphere with the BGM as a slideshow to the user (can provide a slideshow, wherein the BGM and the images provide a sense of togetherness to the user). Consequently, the information processing apparatus 101 can raise the degree of completeness of the slideshow as a content and enhance the degree of satisfaction of the user, who enjoys the slideshow, with the slideshow.

Now, an example of particular use of such an output vector data production process as described above is described.

First, a menu screen displayed on the TV102 by the output control section 236 is described.

Figure 15:
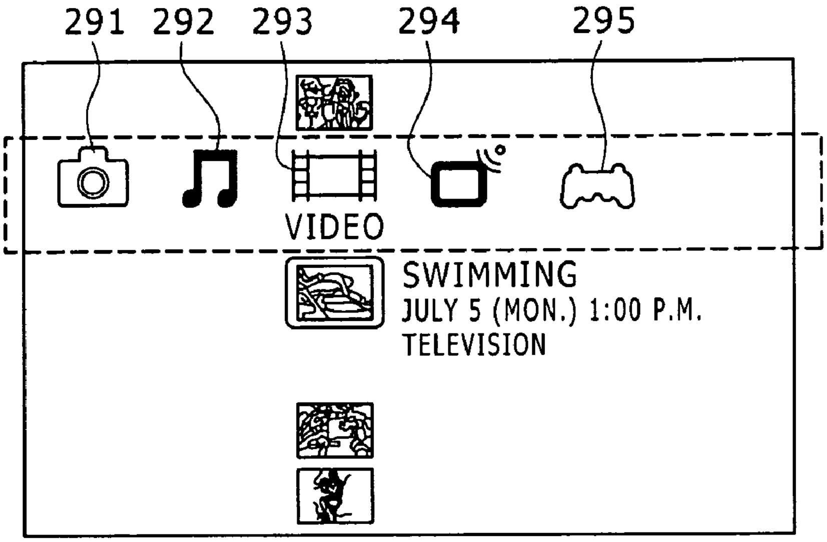
FIG. 15 is a schematic view showing an example of a menu screen.
Figure 16:
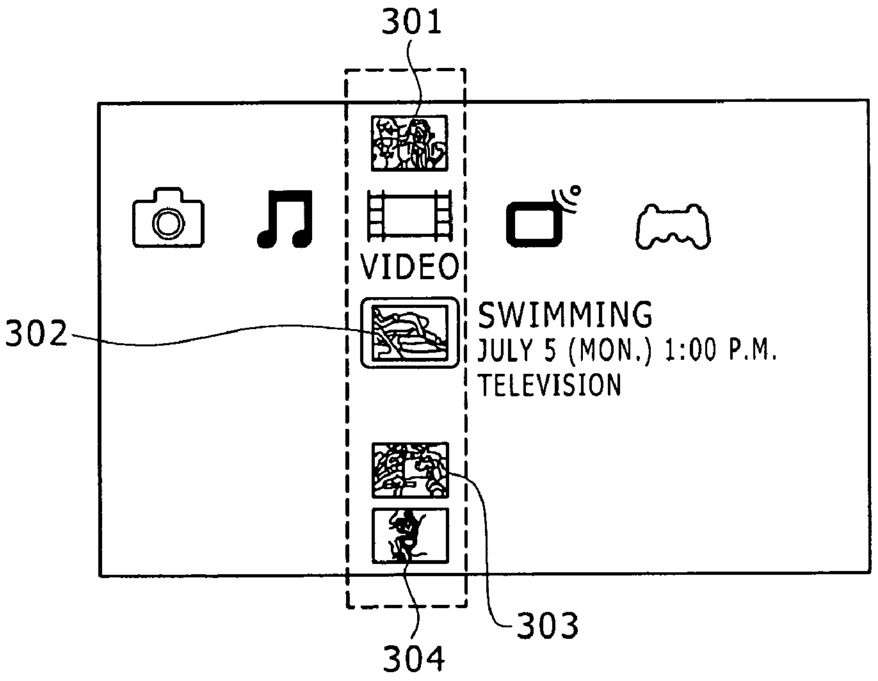
FIG. 16 is a similar view but showing another example of the menu screen.

FIGS. 15 and 16 show an example of a menu screen.

On the menu screen, category icons 291 to 295 which individually represent different categories are displayed in an array in a horizontal direction of the screen and shown surrounded by a broken line in FIG. 15. Further, content icons (video content icons) 301 to 304 which represent contents belonging to that one of the categories which is selected by the user are displayed in an array in a vertical direction of the screen perpendicular to the array direction of the category icons 291 to 295 and shown surrounded by a broken line in FIG. 16. It is to be noted that the broken lines in FIGS. 15 and 16 are not actually displayed on the menu screen.

In the example of FIGS. 15 and 16, the category icon 291 representative of the category of "photo", the category icon 292 representative of the category of "music", the category icon 293 representative of the category of "video", the category icon 294 representative of the category of "television" and the category icon 295 representative of the category of "game" are displayed in order in an array in the rightward direction from the left end of the screen.

Further, in the example of FIGS. 15 and 16, "video" is selected by the user, and the content icons 301 to 304 representative of video contents which belong to "video" are displayed in an array in a vertical direction. From among the content icons 301 to 304, the content icon 302 is currently selected, and a title and so forth of a video content represented by the content icon 302 is displayed alongside the content icon 302.

On such a menu screen as described above, the user can basically select a category by an operation in a horizontal direction (leftward or rightward button) of the remote controller and can select a content which belongs to the selected category by an operation in a vertical direction (upward or downward button).

In response to an operation by the user, the category icons 291 to 295 (category icons 291 to 295 and category icons representative of other categories which are not displayed in FIGS. 15 and 16) and the content icons 301 to 304 (content icons 301 to 304 and other content icons which are not displayed in FIGS. 15 and 16) are moved collectively as a whole and displayed.

For example, if the user depresses the leftward button only once in the state of FIG. 15 wherein "video" is selected, then the category icons 291 to 295 move as a whole in the rightward direction, and the category icon 292 is displayed at the position at which the category icon 293 is displayed in the state of FIGS. 15 and 16 and the category icon 291 is displayed at the position at which the category icon 292 is displayed in the state of FIGS. 15 and 16.

Similarly, the category icon 293 is displayed at the position at which the category icon 294 is displayed in the state of FIGS. 15 and 16, and the category icon 294 is displayed at the position at which the category icon 295 is displayed in the state of FIGS. 15 and 16. Furthermore, a category icon of a different category which is arrayed leftwardly of the category icon 291 and is not shown in FIGS. 15 and 16 is displayed at the position at which the category icon 291 is displayed in the state of FIGS. 15 and 16.

Consequently, "music" is selected in place of "video", and content icons representative of audio contents which belong to "music" are displayed in an array in a vertical direction.

On the other hand, if the user depresses the leftward button only once in the state of FIG. 15, then the category icons 291 to 295 move as a whole in the rightward direction opposite to that where the leftward button is depressed, and "television" is selected.

Further, for example, if the user depresses the upward button only once in the state of FIG. 15 wherein the content icons 301 to 304 are displayed, then the content icons 301 to 304 move as a whole in the upward direction, and the content icon 302 is displayed at the position at which the content icon 301 is displayed in the state of FIGS. 15 and 16 and the content icon 303 is displayed at the position at which the content icon 302 is displayed in the state of FIGS. 15 and 16.

Similarly, the content icon 304 is displayed at the position at which the content icon 303 is displayed in the state of FIGS. 15 and 16, and a category icon which is disposed downwardly of the content icon 304 and is not shown in FIGS. 15 and 16 is displayed at the position at which the content icon 304 is displayed in the state of FIGS. 15 and 16.

Consequently, changeover from the state wherein the content icon 302 is selected to the state wherein the content icon 303 is selected occurs. At this time, a title and so forth of a video content represented by the content icon 303 are displayed alongside the content icon 303.

On the other hand, if the user depresses the downward button only once in the state of FIG. 15, then the content icons 301 to 304 entirely move in the downward direction opposite to that where the upward button is selected, and the content icon 301 is selected.

By selecting a category and a content in such a manner as described above and then depressing a determination button of the remote controller, the user can cause a sub menu, on which operations which can be performed using the currently selected content are displayed in a list, to be displayed. The user can select, from within the sub menu displayed when a certain content is displayed, reproduction, copying, editing, deletion or the like of the currently selected content.

Now, a play list production process executed by the information processing apparatus 101 is described with reference to flow charts of FIGS. 17 to 19.

First, at step S51 of FIG. 17, the output control section 236 causes such a menu screen as described hereinabove with reference to FIGS. 15 and 16 to be displayed. If "photo" is selected on the menu screen, then an icon representative of a wizard which is used to produce or modify a play list is displayed alongside the content icon representative of the photo album.

Figure 17:
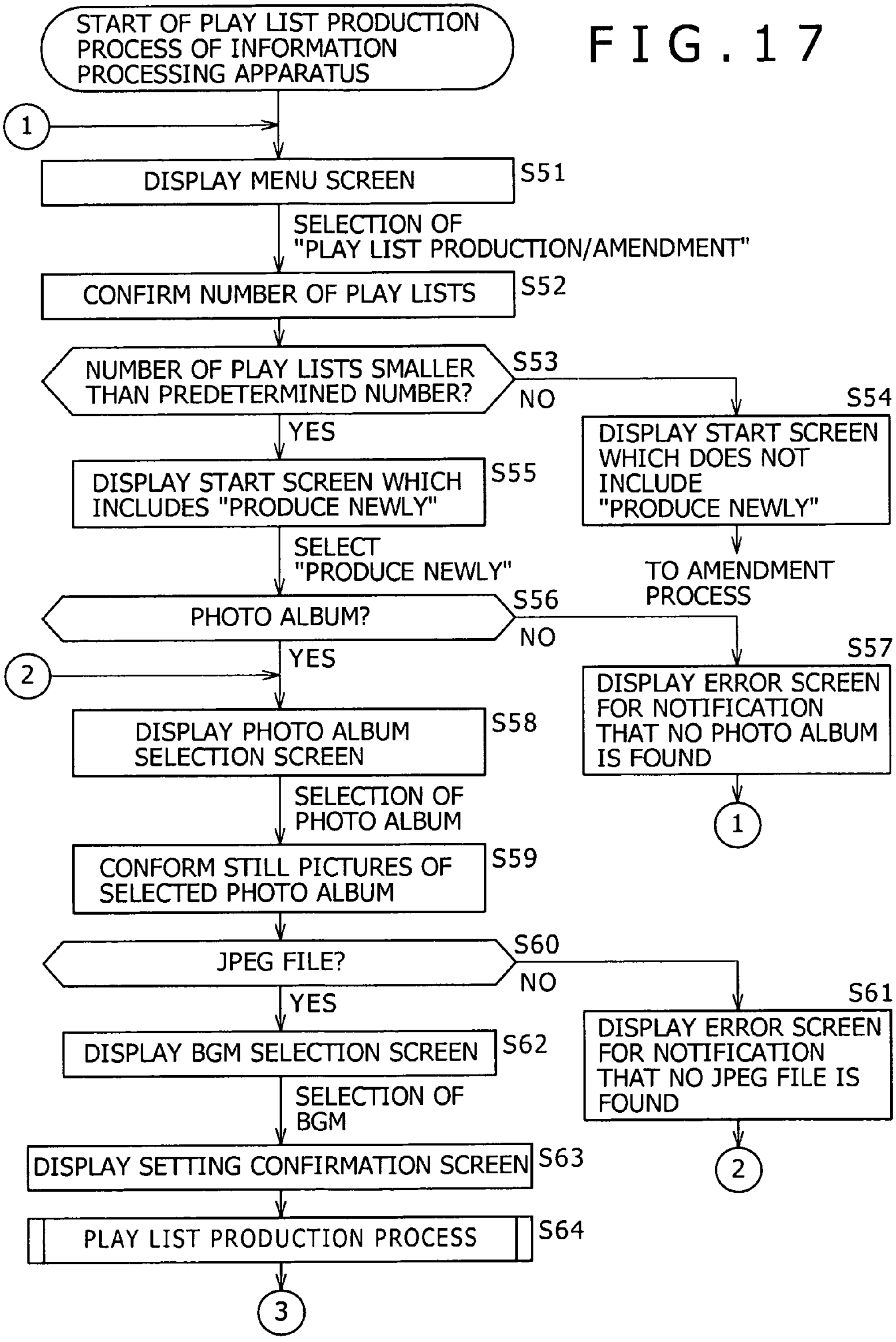
FIGS. 17 to 19 are flow charts illustrating a play list production process of the information processing apparatus.
Figure 20:
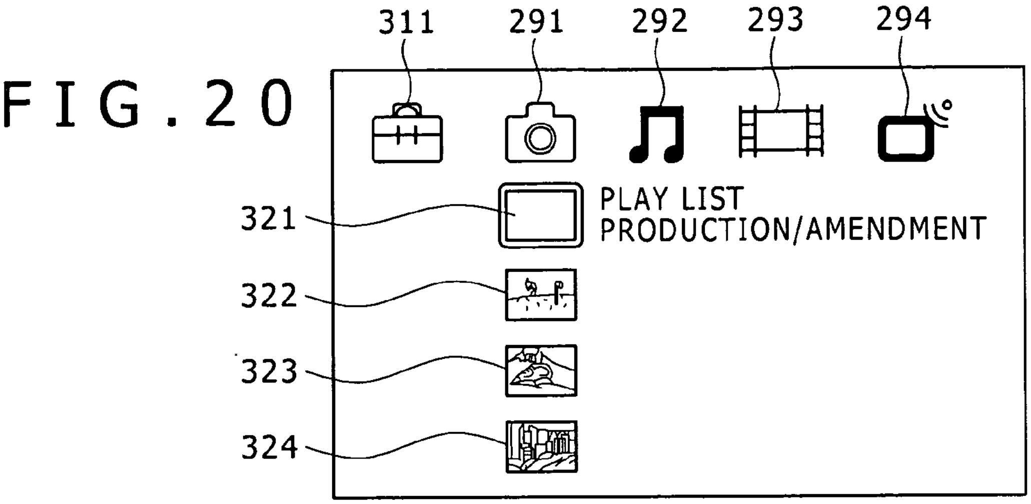
FIG. 20 is a schematic view showing an example of a display screen.

FIG. 20 shows an example of the menu screen displayed at step S51 of FIG. 17.

FIG. 20 shows the menu screen in a state wherein "photo" is selected. Referring to FIG. 20, an icon 321 representative of a wizard and content icons 322 to 324 representative of photo albums are displayed below the category icon 291. In FIG. 20, the icon 321 is selected, and characters of "production/amendment of play list" are displayed on the right side of the icon 321. It is to be noted that, in FIG. 20, a category icon 311 representative of a category of various settings is displayed on the left side of the category icon 291.

When the determination button is selected by the user in the state wherein the icon 321 is selected on the menu screen of FIG. 20 (when an instruction to activate the wizard is issued), the processing advances to step S52.

At step S52, the content management section 231 confirms the number of play lists produced already and stored in the HDD 220. Thereafter, the processing advances to step S53, at which the content management section 231 decides whether or not the number of play lists is equal to or smaller than a predetermined number. In particular, in the present example, an upper limit is set to the number of play lists, and where a number of play lists equal to the upper limit number are produced already, a play list cannot be produced any more.

If the content management section 231 decides at step S53 that the number of play lists is not smaller than the predetermined number (reaches the upper limit), then it notifies the output control section 236 of this. Thereafter, the processing advances to step S54.

At step S54, the output control section 236 causes a start screen, on which production of a new play list cannot be selected, to be displayed.

Although the start screen is not shown in the drawings, it includes, for example, a display of a message "A work may be produced from photographs stored in an album or a work produced already may be modified. . . . " and another display, below the first mentioned display, of characters "to be modified" which is selected when modification to a play list produced already is to be performed.

The user can perform, for example, modification to a play list produced already by depressing the determination button of the remote controller in the state wherein the characters of "to be modified" are selected (displayed in a reverse color). If the characters of "to be modified" are selected, then the play list production process illustrated in FIGS. 17 to 19 is ended, and a play list modification process is started. Description of the play list modification process is omitted herein.

On the other hand, if the content management section 231 decides at step S53 that the number of play lists is equal to or smaller than the predetermined number, then it notifies the output control section 236 of this. Thereafter, the processing advances to step S55.

At step S55, the output control section 236 causes another start screen, on which production of a new play list can be selected, to be displayed.

Although the start screen in this instance has a configuration basically similar to that of the start screen described hereinabove, for example, characters of "to be produced newly" are displayed above the characters of "to be modified". When the determination button is depressed in a state wherein the characters of "to be produced newly" are selected by the user, the processing advances to step S56 to start a new play list production process.

At step S56, the content management section 231 decides whether or not a photo album is stored in the HDD 220. If it is decided that a photo album is not stored, then the content management section 231 notifies the output control section 236 of this. Thereafter, the processing advances to step S57.

At step S57, the output control section 236 causes an error screen, which notifies that there is no photo album, to be displayed.

On the error screen, for example, a message of "An album from which a play list can be produced is not found. The production/modification of a play list is ended." is displayed. Since, in the information processing apparatus 101, selection of a still picture to be reproduced by the slideshow is performed by selection of a photo album as described hereinabove, when there is no photo album, the user cannot select a still picture of an object of reproduction. Thereafter, the processing returns to step S51 so that the processes at the steps beginning with step S51 are performed.

On the other hand, if it is decided at step S56 that a photo album is stored in the HDD 220, then the content management section 231 notifies the output control section 236 of this and outputs information of the photo album (title, image of an icon and so forth of the photo album) stored in the HDD 220 to the output control section 236. Thereafter, the processing advances to step S58.

At step S58, the output control section 236 causes a photo album selection screen to be displayed.

On the selection screen, for example, three icons representative of different photo albums are displayed. On the right side of the icons, for example, "album 2" which is a title of a photo album and "2004/6/2 1:00:32 AM" which is the date and hour of the production (date and hour of fetching) are displayed. The user can select a desired one of the photo albums from within the selection screen.

When a photo album is selected, the content management section 231 confirms the format of still pictures stored in the selected photo album at step S59. Thereafter, the processing advances to step S60, at which the content management section 231 decides a still picture (JPEG file) which is compressed in accordance with the JPEG (Joint Photographic Expert Group) system is included in the photo album selected by the user. In other words, in the present example, a still picture of a processing object is a JPEG file.

If the content management section 231 decides at step S60 that no JPEG file is included in the photo album selected by the user, then it notifies the output control section 236 of this. Thereafter, the processing advances to step S61.

At step S61, the output control section 236 displays an error screen, which is for notification that no JPEG file is found, to be displayed.

On the error screen, for example, a message of "A file which can be utilized for production of a play list is not found. Please select another album." is displayed. After this screen is displayed, the processing returns to step S58 so that selection of a photo album would be performed again.

On the other hand, if the content management section 131 decides at step S80 that a JPEG file is included in the photo album selected by the user, then it notifies the output control section 136 of this. Thereafter, the processing advances to step S82.

At step S62, the output control section 236 causes a selection screen for selection of a tune of BGM to be displayed. Information of the tune of BGM such as the title and an icon is supplied from the BGM/template management section 232.

On the selection screen, for example, three icons representative of different tunes are displayed, and the titles of the tunes are displayed on the right side of the icons. The user can select a desired tune from within the selection screen and use the tune as BGM upon slideshow. Since tunes of BGM and templates are coordinated with each other as described hereinabove, selection of a tune here signifies selection also of a template.

When a tune of BGM is selected, the output control section 236 causes, at step 63, a confirmation screen of the substance of the selections till then (setting relating to a play list to be produced) to be displayed.

On the confirmation screen, for example, "guide to travel" which is a title of a photo album selected by the user, "Music 1" which is a title of the tune of BGM selected by the user, "2:00" which is a period of reproduction time of "Music 1" and so forth are displayed. The user can confirm the substance of the setting and select whether or not a play list should be produced based on the setting".

If an instruction to produce a play list is issued, then a play list production process is performed at step S84. Through the play list production process, such a play list as shown in FIG. 6 is produced in response to selection by the user by the play list production section 135. Details of the play list production process are hereinafter described with reference to a flow chart of FIG. 25. It is to be noted that the play list produced here does not have the "play list name" (FIG. 6) set thereto as yet.

As described above, the user can produce a play list principally by two operations including an operation of selecting a photo album and another operation of selecting a tune of BGM.

Figure 18:
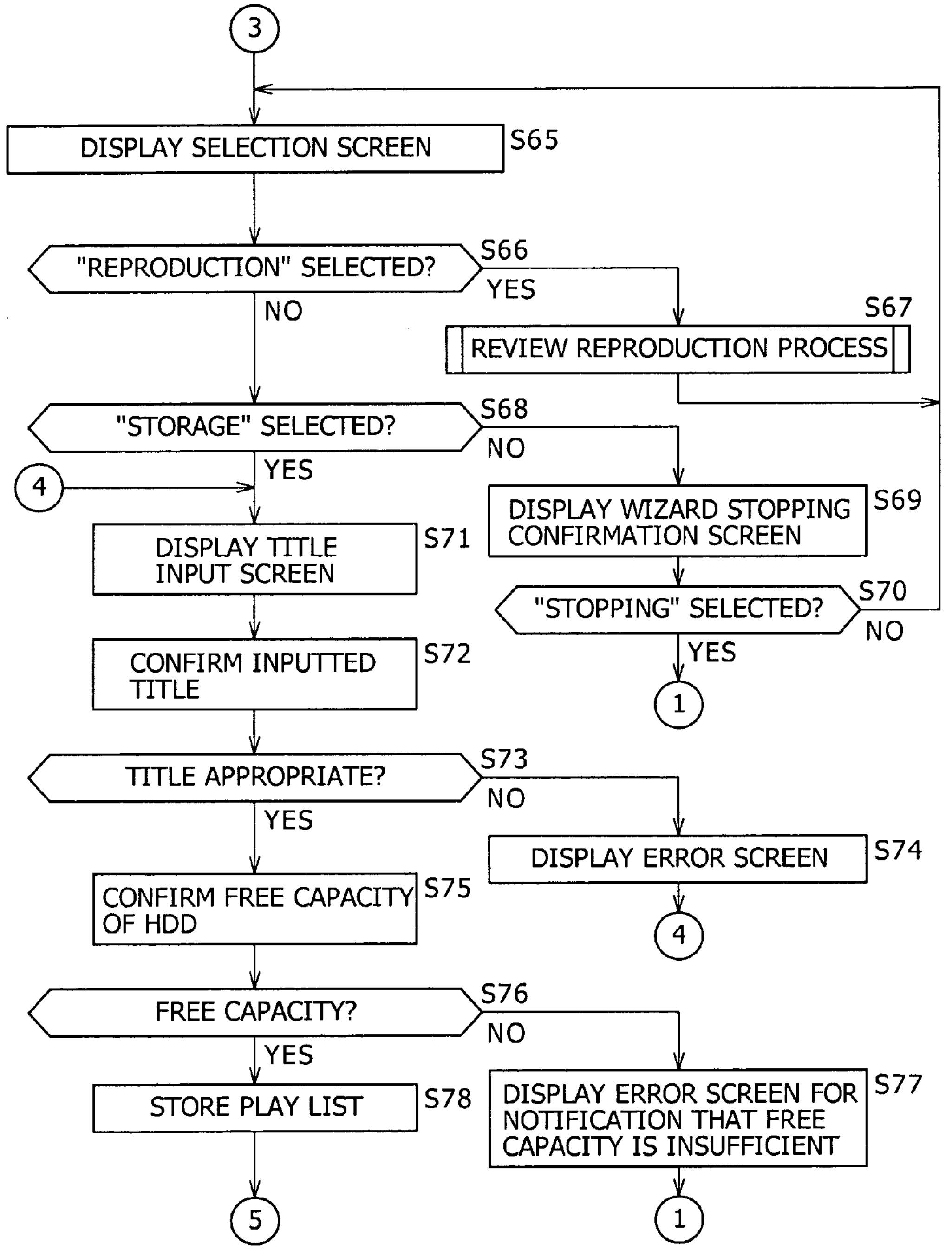

When a play list is produced, the output control section 236 causes a selection screen, on which preview reproduction of the play list or storage of the play list can be selected, to be displayed at step S65 (FIG. 18).

Figure 21:
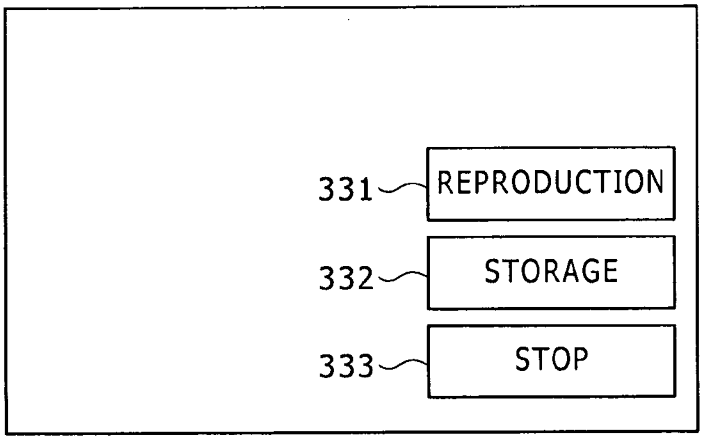
FIGS. 21 to 24 are schematic views showing different examples of the display screen.

FIG. 21 shows an example of the display screen displayed at step S65 of FIG. 18.

On the selection screen of FIG. 21, a reproduction button 331 to be operated in order to perform preview reproduction of the play list produced at step S64, a storage button 332 to be operated in order to store the play list and a stop button 333 to be operated when later processing is to be stopped are displayed.

At step S86, the play list production section 235 decides whether or not the reproduction button 331 of FIG. 21 is operated to select the preview reproduction. If the play list production section 235 decides that the preview reproduction is selected, then it outputs the play list produced by the process at step S64 to the reproduction section 234.

At step S67, a preview reproduction process is performed to reproduce the play list produced by the process at step S64. Consequently, the user can confirm what the still pictures to be reproduced in accordance with a reproduction procedure defined by the play list are. Details of the preview reproduction process are hereinafter described with reference to FIG. 26. When the preview reproduction process comes to an end, the processing returns to step S65 so that the processes at the steps beginning with step S66 are performed.

On the other hand, if the play list production section 235 decides at step S66 that preview reproduction of a play list is not selected, then the processing advances to step S68, at which the play list production section 235 decides whether or not the storage button 332 is operated to select storage of a play list.

If the play list production section 235 decides at step S68 that storage of a play list is not selected, then it decides that the stop button 333 is operated and notifies the output control section 236 of this. Thereafter, the processing returns to step S69.

At step S69, the output control section 236 causes a stopping confirmation screen of the wizard to be displayed.

On the stopping confirmation screen, for example, a message of "The production/modification of a play list is stopped. OK?" is displayed, and characters of "Yes" and "No" are displayed below the message. The user can end the production of a play list by selecting the characters of "Yes" but can continue the production of a play list by selecting the characters of "No".

At step S70, the output control section 236 decides whether or not stopping of production of a play list is selected. If the output control section 236 decides that the stopping is selected, then the processing returns to step S51 so that the processes at the steps beginning with step S51 are executed repetitively. On the other hand, if the output control section 236 decides at step S70 that the stopping is not selected, then the processing returns to step S65 so that the processes at the steps beginning with step S65 are executed.

On the other hand, if the play list production section 235 decides at step S68 that storage of a play list is selected, then it notifies the output control section 236 of this, whereafter the processing advances to step S71. When storage of a play list is selected, the play list produced by the process at step S64 is outputted from the play list production section 235 to the content management section 231.

At step S71, the output control section 236 causes an input screen of a title of a play list (play list name) to be displayed.

On the input screen, for example, a title input place at which a title inputted by the user is to be displayed is displayed, and a keyboard (software keyboard) is displayed below the title input place. The user can operate, for example, the key board to input a title of the play list.

When a title of the play list is inputted, the content management section 231 confirms the inputted title at step S72, whereafter the processing advances to step S73, at which the content management section 231 decides whether or not the title is appropriate.

If the content management section 231 decides at step S73 that the inputted title is not appropriate, then it notifies the output control section 236 of this, whereafter the processing advances to step S74. It is decided that the title is not appropriate, for example, when one of the play lists set already has the same title or when the inputted title includes a character whose use is inhibited or in a like case.

At step S74, the output control section 236 causes an error screen to be displayed which is for the notification that the inputted title is inappropriate.

For example, on the error screen which is displayed where a play list having the same title set thereto already exists, a message of "The inputted name is overlapping or illegal. Please change the title name." is displayed.

On the other hand, on the error screen which is displayed when the inputted title includes a character whose use is inhibited, a message of "The following characters cannot be used." and those characters which cannot be used are displayed in addition to a message same as the message displayed on the error screen described above.

After the error screen for the notification that the title is inappropriate is displayed, the processing returns to step S71, at which inputting of a title is performed again.

On the other hand, if the content management section 231 decides at step S73 that the inputted title is appropriate, then the processing advances to step S75, at which the free capacity of the HDD 220 is confirmed.

At step S76, the content management section 231 decides whether or not the HDD 220 has a free capacity sufficient to store the play list. If the content management section 231 decides that the HDD 220 does not have a sufficient free capacity, then it notifies the output control section 236 of this. Thereafter, the processing advances to step S77.

At step S77, the output control section 236 causes an error screen for the notification that the free capacity is insufficient to be displayed.

On the error screen, for example, a message of "The capacity of the hard disk is insufficient. Please delete unnecessary titles, tracks or photos. The production/modification of the play is ended." is displayed.

After the error screen for the notification that the free capacity is insufficient, the processing returns to step S71 so that the processes at the steps beginning with step S71 are executed.

On the other hand, if the content management section 231 decides at step S76 that the free capacity sufficient to store the play list remains in the HDD 220, then the processing advances to step S78, at which it stores the produced play list as a content which belongs to "photo". Consequently, an icon of the stored play list is displayed for "photo" of the menu screen.

Figure 22:
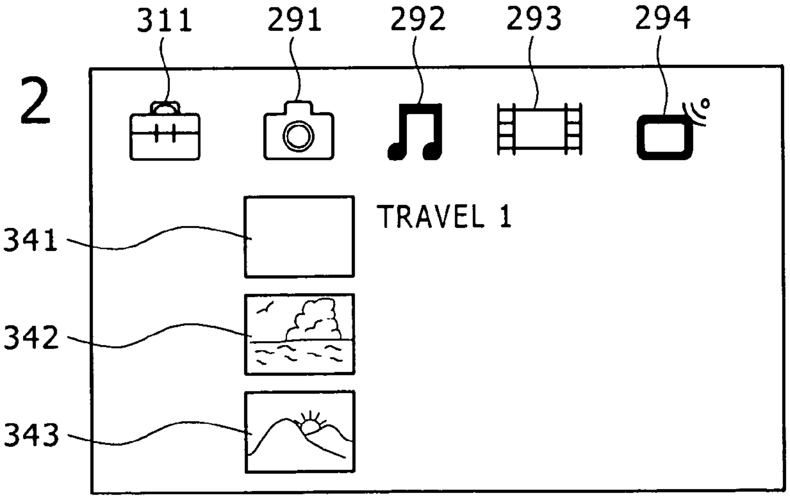

FIG. 22 shows an example of the menu screen on which the play list is added as a content which belongs to "photo".

On the screen of FIG. 22, category icons 291 to 294 and a category icon 311 are displayed in a horizontal array, and the category which is selected currently is "photo". When "photo" is selected, an icon 341 representative of the play list stored by the process at step S68 of FIG. 18 is displayed below the category icon 291 as seen in FIG. 22. On the right side of the icon 341, "travel" which is the title of the play list is displayed.

In this manner, the play list is displayed as a content of "photo" similarly to another still picture content (photo album) on the menu screen. Accordingly, the user can select the play list in a similar feeling as upon selection of another still picture content and perform reproduction and so forth of the play list. On the screen of FIG. 22, content icons 342 and 343 displayed below the icon 341 represent photo albums. It is to be noted that not an icon representative of a play list may be displayed alongside an icon representative of a photo album but one folder may be displayed alongside an icon representative of a photo album while an icon of a produced play list is displayed in a hierarchy lower than that of the folder.

When the play list is stored, the content management section 231 confirms at step S79 (FIG. 19) whether or not recording of a television program is being performed by the recording/reproduction section 217.

As described hereinabove, in the information processing apparatus 101, output vector data which are equivalent to a result of reproduction of a play list can be stored as a content (slideshow content), and it is confirmed here whether or not production of a slideshow content is possible. When the recording/reproduction section 217 which performs MPEG2 encoding is executing MPEG2 encoding such as recording of a television program, production of a slideshow content which is considered as a content of the same type is impossible. Naturally, it is possible to eliminate such restriction. In other words, it is otherwise possible to omit the confirmation here.

At step S80, the content management section 231 decides whether or not the recording/reproduction section 217 is executing recording. If the content management section 231 decides that the recording/reproduction section 217 is executing recording, then it notifies the output control section 236 of this, whereafter the processing advances to step S81.

At step S81, the output control section 236 causes an error screen for the notification that production of a slideshow content cannot be performed to be displayed.

On the error screen, for example, a message of "The play list is stored. Video production cannot be carried out during recording. Please perform video production from the play list after the recording is ended. The play list production/modification is ended." is displayed. The "video" in the message signifies a "slideshow content".

After the error screen for the confirmation that a slideshow content cannot be produced is displayed, the processing returns to step S51 so that the processes at the steps beginning with step S51 are executed. The user can select the icon of the play list displayed as a content belonging to "photo" from within the menu screen and perform production of a slideshow content from a sub menu (a list of operations which can be performed using the play list) displayed in response to the selection of the icon. The "Please perform video production from the play list after the recording is ended." from within the message displayed on the error screen represents this.

On the other hand, if the content management section 231 decides at step S80 that the recording/reproduction section 217 is not executing recording, that is, production of a slideshow content is possible, then the processing advances to step S82. At step S82, the content management section 231 confirms the number of video contents (including television programs and slideshow contents) stored in the HDD 220. In particular, in the present example, an upper limit is set to the number of video contents which can be stored in the HDD 220, and when a number of video contents equal to the upper limit number are stored already, storage of any more video content is inhibited.

At step S83, the content management section 231 decides whether or not the number of video contents is equal to or smaller than a predetermined number. If the content management section 231 decides that the number of video contents is not smaller than the predetermined number (reaches the upper limit number), then it notifies the output control section 236 of this, and the processing advances to step S84.

At step S84, the output control section 236 causes an error screen for the notification that production (storage) of a slideshow content is impossible to be displayed.

On the error screen, a message of "Full titles exist. Please delete unnecessary titles, tracks and photos. The play list production/modification is ended." is displayed.

After the error screen for the notification that production of a video content is impossible is displayed, the processing returns to step S51 so that the processes at the steps beginning with step S51 are executed.

On the other hand, if the content management section 231 decides at step S83 that the number of video contents is equal to or smaller than the predetermined number, then it notifies the output control section 236 of this, and the processing advances to step S85.

At step S85, the output control section 236 causes a selection screen for the selection of whether or not the slideshow content should be stored to be displayed.

Figure 19:
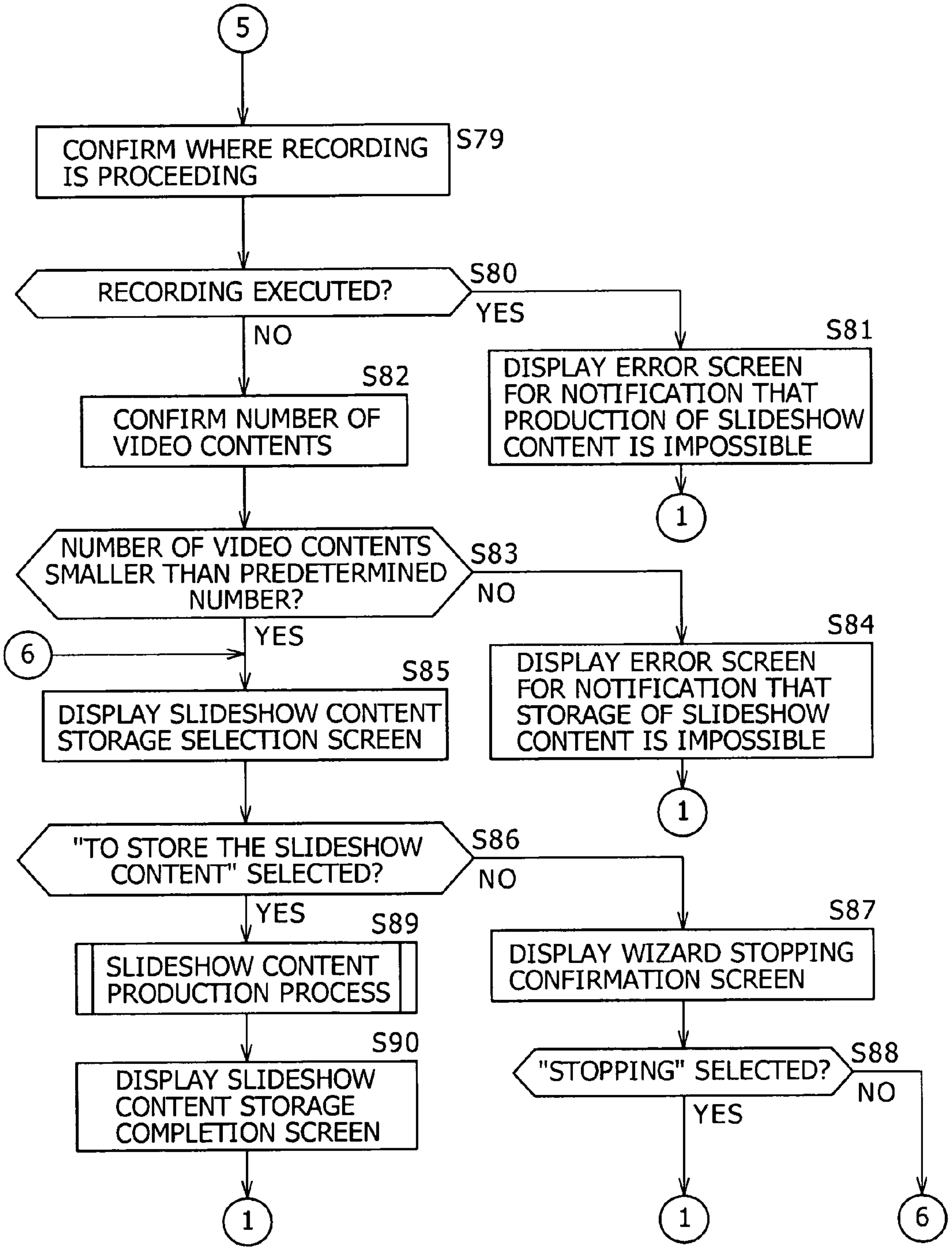
Figure 23:
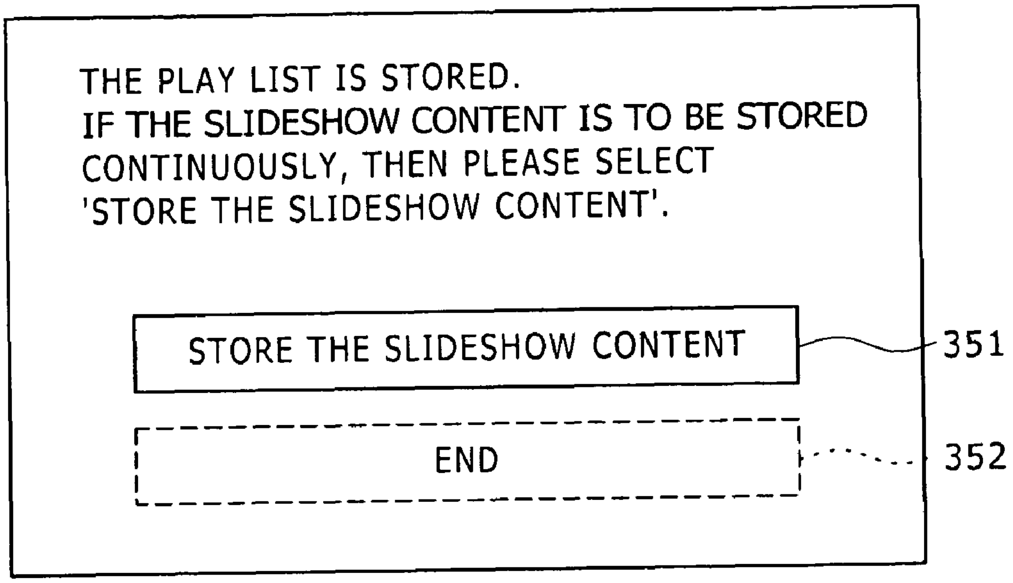

FIG. 23 shows an example of the selection screen displayed at step S85 of FIG. 19.

On the screen of FIG. 23, a message of "The play list is stored. If the slideshow content is to be stored continuously, then please select 'store the slideshow content'." is displayed.

Further, at a lower portion of the screen of FIG. 23, a GUI button 351 on which characters "store the slideshow content" to be selected when a slideshow content is to be stored and another GUI button 352 on which characters of "end" for ending the process without storing the slideshow content are displayed. The user can store the slideshow content into the HDD 220 by operating the remote controller to select the GUI button 351 on which the characters "Store the slideshow content" are displayed.

At step S86, the content management section 231 decides whether or not the characters "Store the slideshow content" are selected from within the selection screen of FIG. 23. If the content management section 231 decides that the characters "store the slideshow content" are not selected, that is, if the content management section 231 decides that the characters "End" are selected from within the selection screen of FIG. 23, then it notifies the output control section 236 of this. Thereafter, the processing advances to step S87.

At step S87, the output control section 236 causes a stopping confirmation screen of the wizard to be displayed. The stopping confirmation screen displayed here is same as the screen displayed at step S69 of FIG. 18.

At step S88, it is decided whether or not stopping of the wizard is selected from within the stopping confirmation screen. If it is decided that the stopping is selected, then the processing returns to step S51 so that the processes at the steps beginning with step S51 are executed. On the other hand, if it is decided at step S88 that the stopping of the wizard is not selected, then the processing returns to step S85, at which it is selected again whether or not the slideshow content should be stored.

On the other hand, if the content management section 231 decides at step S86 that the characters of "store the slideshow content" are selected from within the selection screen of FIG. 23, then the processing advances to step S89.

At step S89, a slideshow content production process is performed. The slideshow content produced by the slideshow content production process is outputted from the slideshow content production section 233 to the content management section 231 and stored into the HDD 220. Details of the slideshow content production process are hereinafter described with reference to a flow chart of FIG. 27.

At step S90, the output control section 236 causes a storage completion screen for the notification that storage of the slideshow content is completed to be displayed.

On the storage completion screen, for example, a message for the notification that the slideshow content produced by the process at step S89 is stored as one of contents which belong to "video" is displayed.

Consequently, to "video" on the menu screen, an icon representative of the slideshow content is displayed additionally.

Figure 24:
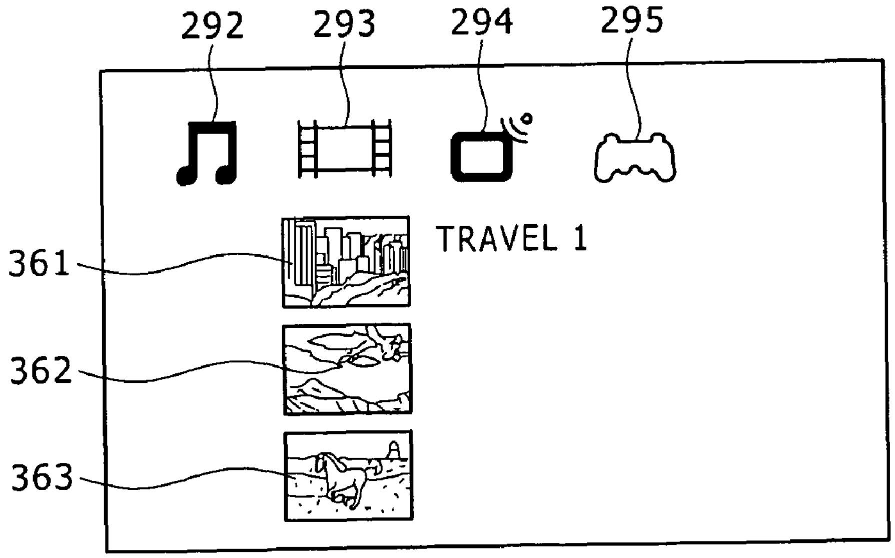

FIG. 24 shows an example of the menu screen on which an icon representative of the slideshow content is added as an icon of a content which belongs to "video".

On the screen of FIG. 24, category icons 292 to 295 are displayed in a horizontal array, and the currently selected category is "video". At this time, an icon 361 representative of the slideshow content is displayed below the category icon 293 as seen in FIG. 24.

On the right side of the icon 361, "Travel 1" which is a title of the slideshow content is displayed. In particular, the slideshow content represented by the icon 361 of FIG. 24 is produced from a result of reproduction of the play list represented by the icon 341 of FIG. 22, and the same title as that of the play list represented by the icon 341 of FIG. 22 is set to the slideshow content.

In this manner, the slideshow content produced from a result of reproduction of the play list is displayed as a content belonging to "video" similarly to the other video contents such as a television program on the menu screen. Accordingly, the user can select the slideshow content in a same feeling as that upon selection of any other video content and perform reproduction and so forth of the slideshow content. On the screen of FIG. 24, content icons 362 and 363 displayed below the icon 361 represent video contents of television programs.

It is to be noted that the user may write (record) the slideshow content on the optical disk 225 or transmit the slideshow content to another apparatus through the communication section 221 similarly to any other video content of a television program. Accordingly, the user can load the optical disk 225 on which the slideshow content is recorded into another player or the like to enjoy the slideshow content.

In such a series of processes relating to a slideshow as described above, the output vector data production process described hereinabove with reference to the flow charts of FIGS. 12 and 13 is executed. Consequently, the information processing apparatus 101 can reproduce images whose reproduction time period coincides with that of BGM as a slideshow to the user. In particular, whatever length a tune designated as BGM has, the information processing apparatus 101 can adjust the starting end and the last end of a photograph slideshow with music to those of the music thereby to provide the user with a high-quality slideshow of a high degree of completeness, and therefore can enhance the degree of satisfaction of the user. In other words, the information processing apparatus 101 can suppress such a situation that, of a photograph slideshow content with music, only sound is outputted or only an image is displayed.

Further, since the output vector data production section 242 detects a tail fade-out interval and applies a fade-out process to an image content allocated to the interval (adds a setting for performing a fade-out process to the vector data) or applies an additional image process to the image content (adds an additional image process setting to the vector data), the information processing apparatus 101 can provide images which coincides in atmosphere with the BGM as a slideshow to the user (provide a slideshow, whose BGM and images provide a sense of togetherness, to the user). Consequently, the information processing apparatus 101 can enhance the degree of completeness as a content of a slideshow and enhance the degree of satisfaction of the user, who enjoys the content, with the slideshow.

Figure 25:
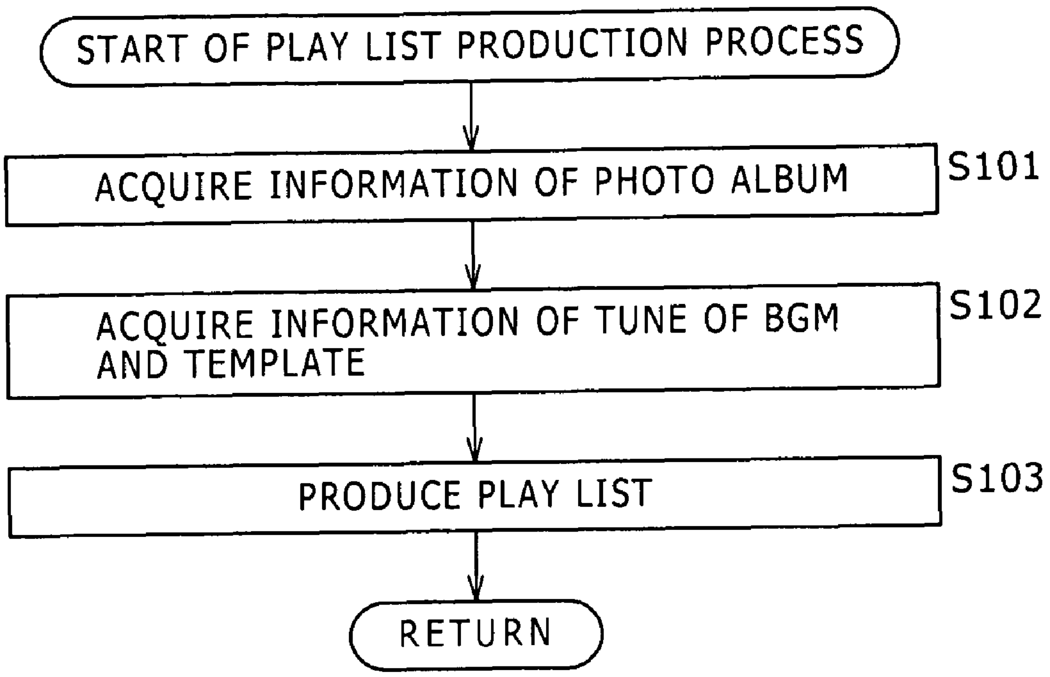
FIG. 25 is a flow chart illustrating details of the play list production process.

Now, the play list production process performed at step S64 of FIG. 17 is described with reference to a flow chart of FIG. 25.

At step S101, the play list production section 235 acquires identification information such as the title of a photo album selected by the user, and then the processing advances to step S102. At step S232, the play list production section 235 acquires identification information of a tune of BGM selected by the user and identification information of a template coordinated with the tune. When the photo album is selected by the user, the title and so forth of the photo album are supplied from the content management section 231. Further, when the tune of BGM is selected by the user, identification information of the tune and identification information of the template coordinated with the tune are supplied from the BGM/template management section 232.

At step S103, the play list production section 235 produces a play list by describing the identification information of the photo album acquired at step S101 as "photo album" (FIG. 6) and describing the tune of BGM and the identification information of the template acquired at step S102 as "used tune" and "used template", respectively. After the play list is produced, the processing returns to step S64 of FIG. 17 so that the processes at the steps beginning with step S64 are executed.

It is to be noted that, where "preferential image" is selected by the user, also describing of the same is performed. Further, "play list name" is described in the play list when a title is inputted by the user (when it is decided at step S73 of FIG. 18 that the inputted title is appropriate).

The play list produced through such processes as described above by the play list production section 235 is supplied to the reproduction section 234 when an instruction to perform preview reproduction of the play list is issued by the user. Further, when another instruction to store the play list is issued, the play list is supplied to the content management section 231.

Figure 26:
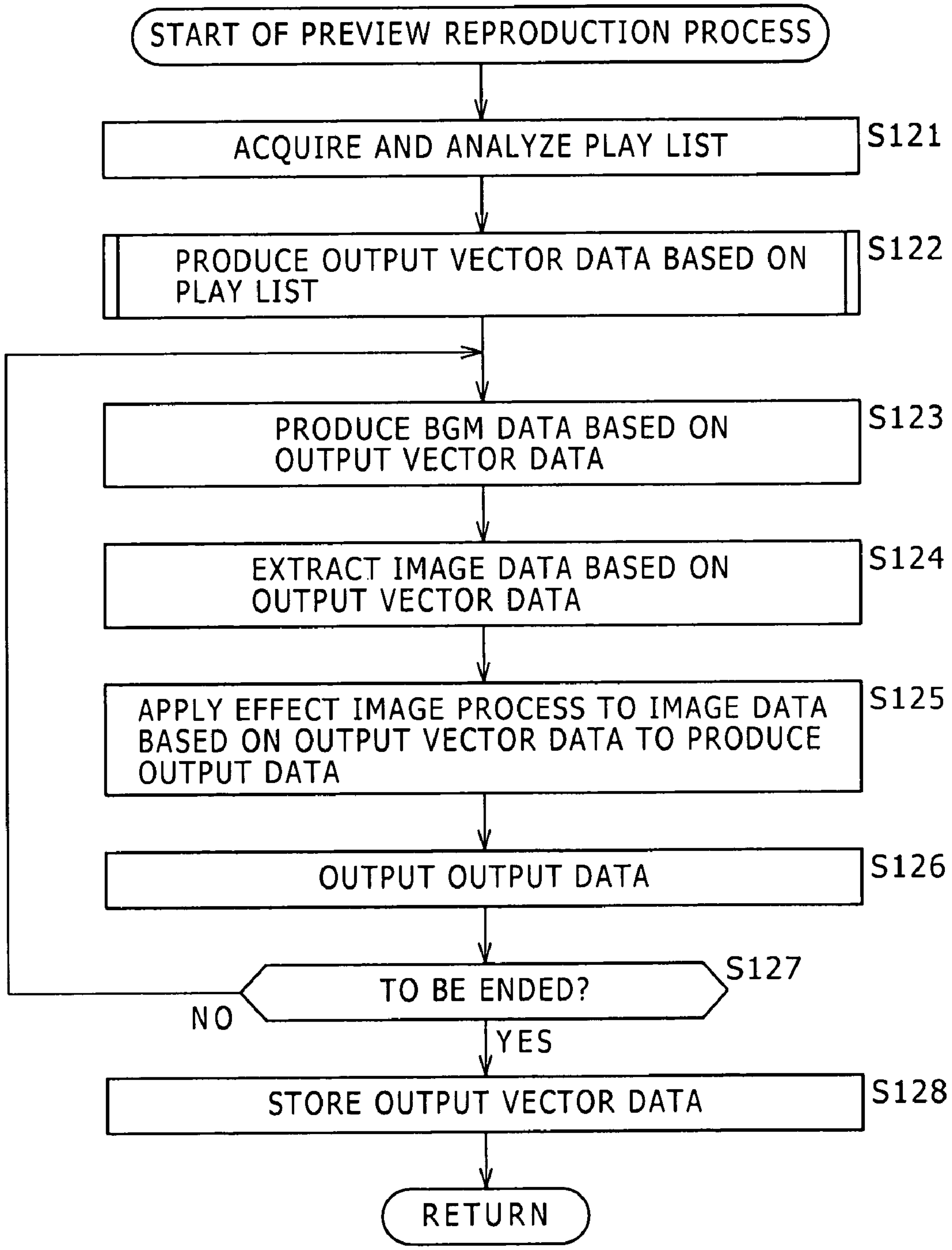
FIG. 26 is a flow chart illustrating details of a preview reproduction process.

Now, the preview reproduction process performed at step S67 of FIG. 18 is described with reference to a flow chart of FIG. 26. The preview reproduction process is performed based on a play list.

At step S121, the play list reproduction control section 241 (FIG. 10) acquires a play list supplied thereto from the play list production section 235, analyzes the play list and supplies information necessary for production of output vector data to the output vector data production section 242.

At step S122, the output vector data production section 242 executes the output vector data production process described hereinabove with reference to FIGS. 12 and 13 as a sub flow process to produce output vector data based on the play list (information supplied thereto from the play list reproduction control section 241).

In particular, the output vector data production section 242 executes the output vector data production process of FIGS. 12 and 13 to allocate display of still pictures (image content), to which an effect is applied, to the playing interval of the BGM data and further performs an image process for the image content as occasion demands to produce output vector data for controlling the output so that images of a representation suitable for the BGM (length and tone of the tune of the BGM). Then, the output vector data production section 242 supplies the produced output vector data to the BGM reproduction section 244, extraction section 245 and effect image processing section 246.

It is to be noted that, while it is described hereinabove with reference to FIGS. 12 and 13 that the output vector data production section 242 ends the output vector data production process after it ends the process at step S40, since, in this instance, the output vector data production section 242 executes the output vector data production process as a sub flow process, the processing is returned to step S122 after all processes are completed so that the processes at the steps beginning with step S123 are executed.

At step S123, the BGM reproduction section 244 acquires and reproduces BGM data based on the output vector data produced in this manner and supplies the BGM data to the effect image processing section 246 and so forth. At step S124, the extraction section 245 acquires a photo album based on the output vector data, extracts image data (still pictures of an object of reproduction) from the photo album and stores the image data into the internal memory 247.

At step S125, the effect image processing section 246 acquires image data from the internal memory 247 based on the output vector data and performs an effect image process for the image data to produce output data.

At step S126, the effect image processing section 246 outputs the produced output data to the output control section 236. The output control section 236 outputs the output data to the outside (for example, the TV102 or the like) of the information processing apparatus 101 at a predetermined timing.

At step S127, the play list reproduction control section 241 decides whether or not the preview reproduction process should be ended. If it is decided that the preview reproduction process should not be ended, then the processing is returned to step S123 so that the processes at the steps beginning with step S123 are executed repetitively. On the other hand, if it is decided at step S127 that the preview reproduction process should be ended, then the play list reproduction control section 241 advances the processing to step S128. At step S128, the effect image processing section 246 stores the output vector data utilized for the production of the output data into the internal memory 247 and then ends the preview reproduction process. Thereafter, the processing is returned to step S67 of FIG. 17 so that the processes at the steps beginning with step S67 are executed.

Since the output vector data production section 242 allocates, in the preview reproduction process, an image content to the playing time of a sound content based on the play list and produces output vector data for controlling so that an image process suitable for a tune of the sound content is applied to the image content in such a manner as described above, the information processing apparatus 101 can provide the user with a high-quality slideshow having a high degree of completeness and can enhance the degree of satisfaction of the user whatever length a tune designated as BGM has. In other words, the information processing apparatus 101 can suppress such a situation that, of a photograph slideshow content with music, only sound is outputted or only an image is displayed.

Further, since the output vector data production section 242 detects, in the preview reproduction process, a tail fade-out interval and applies a fade-out process to an image content allocated to the interval (adds a setting for performing a fade-out process to the vector data) or applies an additional image process to the image content (adds an additional image process setting to the vector data), the information processing apparatus 101 can provide images which coincides in atmosphere with the BGM as a slideshow to the user (provide a slideshow, whose BGM and images provide a sense of togetherness, to the user). Consequently, the information processing apparatus 101 can enhance the degree of completeness as a content of a slideshow and enhance the degree of satisfaction of the user, who enjoys the content, with the slideshow.

Figure 27:
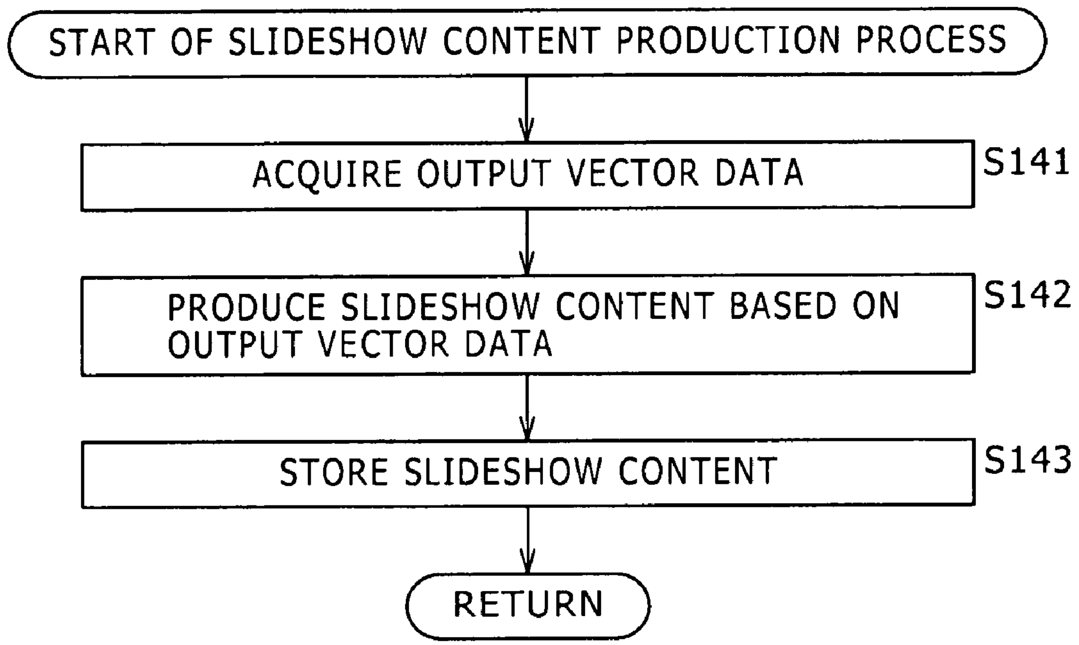
FIG. 27 is a flow chart illustrating details of a slideshow content production process.

Now, the slideshow content production process performed at step S89 of FIG. 19 is described with reference to a flow chart of FIG. 27. This slideshow content is produced from output vector data wherein effects (images) are applied to the playing time period of BGM (sound) (further, an image process is applied in accordance with a tune of the BGM) in such a manner as described hereinabove. Further, the slideshow content production process is executed as a succeeding process of the play list reproduction process.

In particular, after the slideshow content production process is started in response to an instruction of the user or the like, the slideshow content production section 233 acquires output vector data held in the internal memory 247 of the reproduction section 234 at step S141.

After the output vector data are acquired, the slideshow content production section 233 produces a slideshow content by adding other information such as the title to the acquired output vector data at step S142. The produced slideshow content is supplied to the content management section 231.

At step S143, the content management section 231 supplies the slideshow content to the HDD 220 so as to be stored and then ends the slideshow content production process. Thereafter, the processing returns to step S89 of FIG. 19 so that the processes at the steps beginning with step S109 are executed.

After the slideshow content is stored in this manner, an icon representative of the slideshow content is added to "video" of the menu screen.

Figure 28:
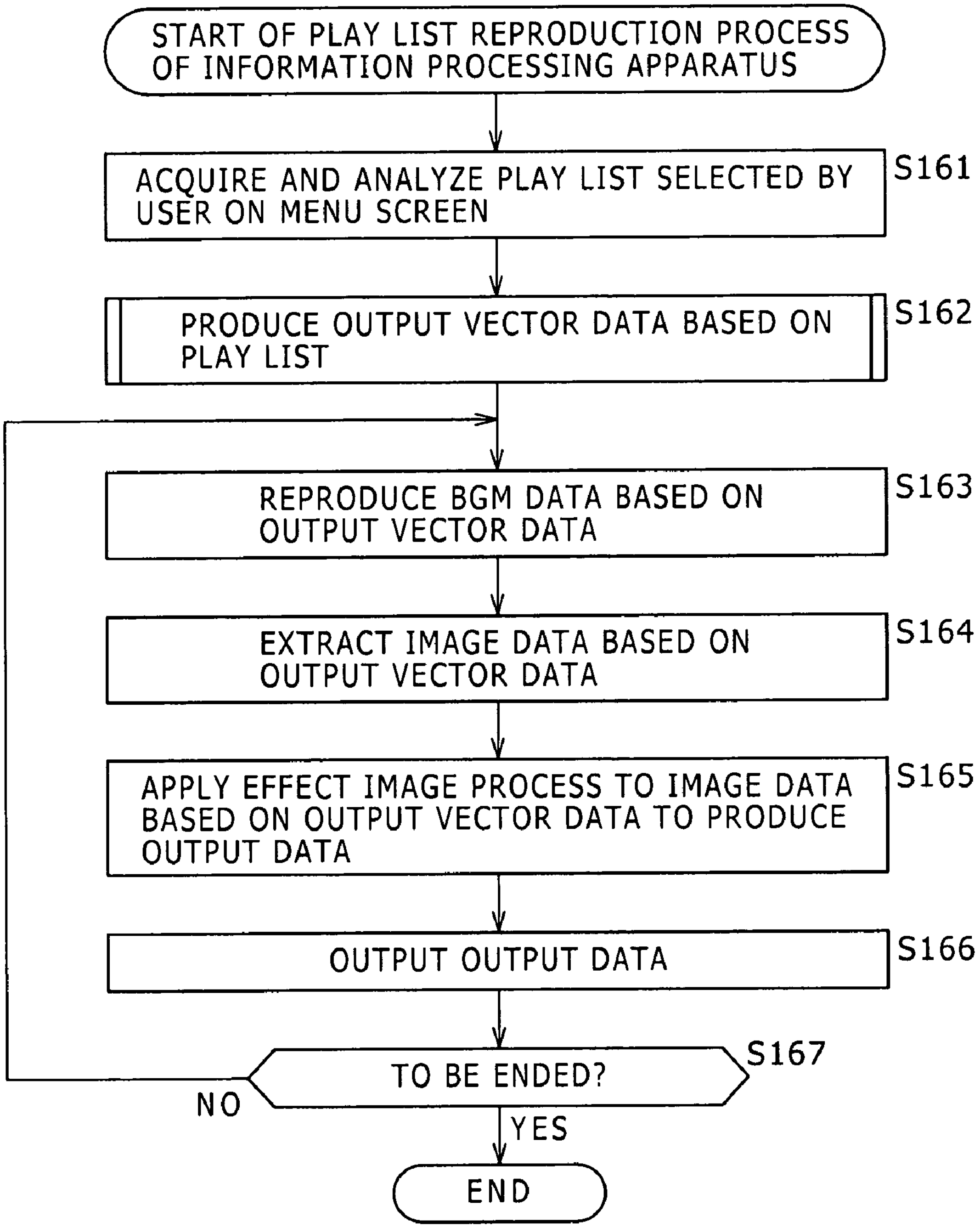
FIG. 28 is a flow chart illustrating a play list reproduction process of the information processing apparatus.

Now, the play list reproduction process performed by the information processing apparatus 101 is described with reference to a flow chart of FIG. 28.

This process is performed when an instruction to reproduce a play list produced by such a series of processes as described above is issued on the menu screen by the user. In other words, the play list reproduction process involves processes basically similar to those of the preview reproduction process described hereinabove with reference to the flow chart of FIG. 24.

In particular, at step S161, the play list reproduction control section 241 (FIG. 10) acquires a play list selected from within the menu screen by the user, analyzes the play list and supplies information necessary for production of output vector data to the output vector data production section 242. This process corresponds to the process at step S121 of FIG. 26.

At step S162, the output vector data production section 242 executes the output vector data production process described hereinabove with reference to the flow charts of FIGS. 12 and 13 as a sub flow process to produce output vector data based on the play list (information supplied from the play list reproduction control section 241). This process corresponds to step S122 of FIG. 26. However, in this instance, the output data production process 242 returns the processing to step S162 after all processes are completed so that the processes at the steps beginning with step S163 are executed.

At step S163, the BGM reproduction section 244 acquires and reproduces BGM data based on the output vector data and supplies the reproduced BGM data to the effect image processing section 246 and so forth. This process corresponds to the process at step S123 of FIG. 26. At step S164, the extraction section 245 extracts image data (still pictures of an object of reproduction) from the photo album based on the output vector data and stores the image data into the internal memory 247. This process corresponds to the process at step S124 of FIG. 26.

At step S165, the effect image processing section 246 acquires image data from the internal memory 247 based on the output vector data and performs an effect image process for the image data to produce output data. This process corresponds to the process at step S125 of FIG. 26.

At step S166, the effect image processing section 246 outputs the produced output data to the output control section 236. The output control section 236 outputs the output data to the outside (for example, the TV102 or the like) of the information processing apparatus 101 at a predetermined timing. This process corresponds to the process at step S126 of FIG. 26.

At step S167, the play list reproduction control section 241 decides whether or not the play list reproduction process should be ended. This process corresponds to the process at step S127 of FIG. 26. If it is decided that the play list reproduction process should not be ended, then the play list reproduction control section 241 returns the processing to step S163 so that the processes at the steps beginning with step S163 are executed repetitively. On the other hand, if it is decided at step S167 that the play list reproduction process should be ended, then the play list reproduction control section 241 ends the play list reproduction process.

Figure 29:
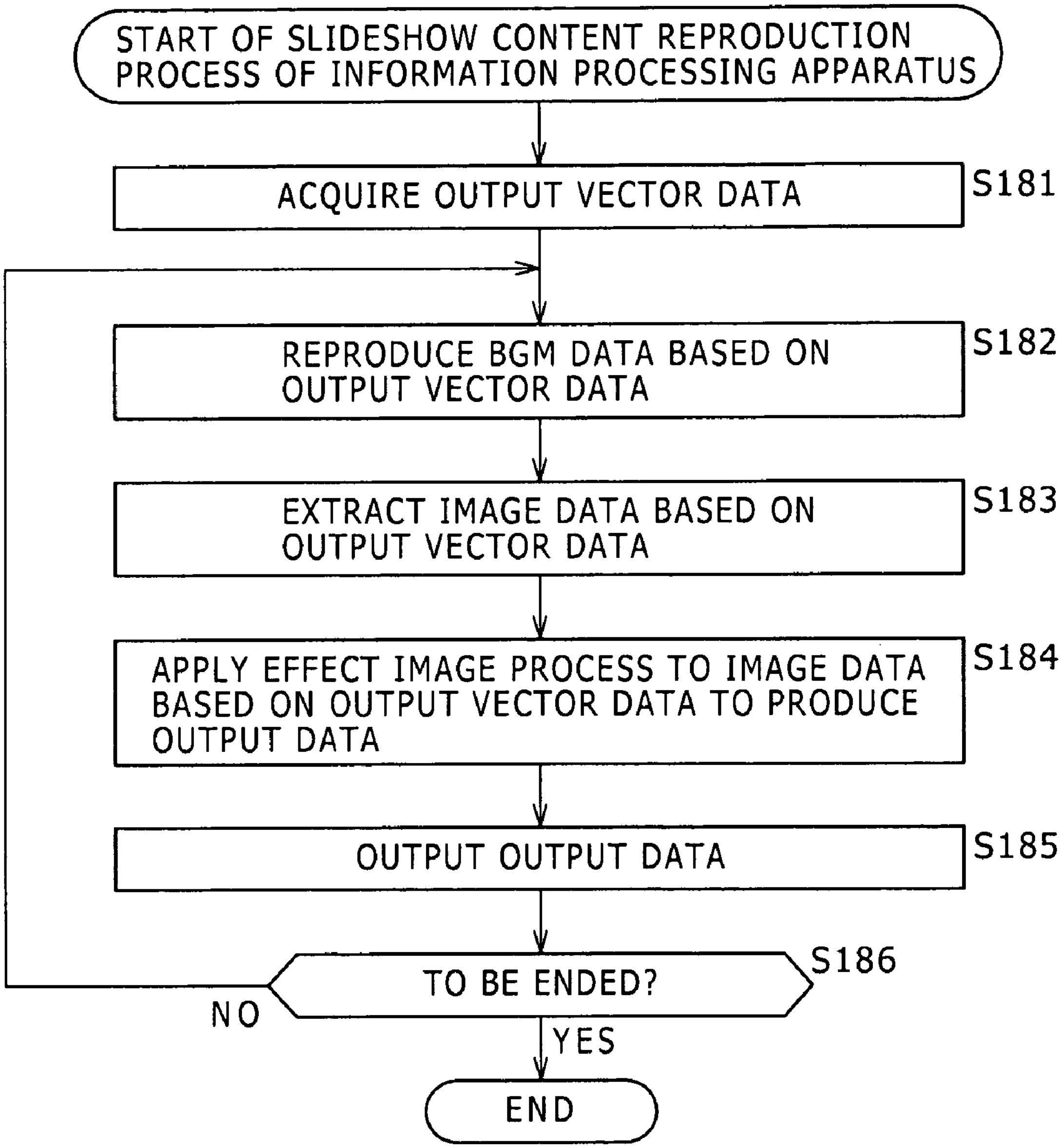
FIG. 29 is a flow chart illustrating a slideshow content reproduction process of the information processing apparatus.

Now, a reproduction process of a slideshow content performed by the information processing apparatus 101 is described with reference to a flowchart of FIG. 29.

This process is performed when an instruction to reproduce a slideshow content produced through such a series of processes as described above is issued on the menu screen by the user. In particular, also the slideshow content reproduction process involves processes basically similar to those of the play list reproduction process described above with reference to the flow chart of FIG. 28.

It is to be noted, however, that, in the present slideshow content reproduction process, not a play list but a slideshow content (output vector data) is utilized.

Accordingly, the slideshow content reproduction control section 243 (FIG. 10) acquires, at step S181, a slideshow content selected on the menu screen by the user and acquires output vector data included in the slideshow content. Then, the slideshow content reproduction control section 243 supplies the acquired output vector data to the BGM reproduction section 244, extraction section 245 and effect image processing section 246. This process corresponds to steps S161 and S162 of FIG. 28.

At step S182, the BGM reproduction section 244 acquires and reproduces BGM data based on the output vector data and supplies the BGM data to the effect image processing section 246 and so forth. This process corresponds to the process at step S163 of FIG. 28. At step S183, the extraction section 245 extracts image data (still pictures of a reproduction object) from the photo album based on the output vector data and stores the image data into the internal memory 247. This process corresponds to the process at step S164 of FIG. 28.

At step S184, the effect image processing section 246 acquires image data from the internal memory 247 based on the output vector data and performs an effect image process for the image data to produce output data. This process corresponds to the process at step S165 of FIG. 28.

At step S185, the effect image processing section 246 outputs the produced output data to the output control section 236. This process corresponds to the process at step S166 of FIG. 28.

At step S186, the slideshow content reproduction control section 243 decides whether or not the slideshow content reproduction process should be ended. If the slideshow content reproduction process should not be ended, then the processing returns to step S182 so that the processes at the steps beginning with step S182 are executed repetitively. On the other hand, if it is decided at step S186 that the slideshow content reproduction process should be ended, then the slideshow content reproduction control section 243 ends the slideshow content reproduction processes.

Consequently, the user can enjoy the slideshow content in a feeling similar to that upon enjoyment of other video contents such as a television program.

As described above, the information processing apparatus 101 can provide the user with images whose reproduction time period coincides with that of BGM. In particular, whatever length a tune designated as BGM has, the information processing apparatus 101 can adjust the starting end and the last end of a photograph slideshow with music to those of the music thereby to provide the user with a high-quality slideshow of a high degree of completeness, and therefore can enhance the degree of satisfaction of the user. In other words, the information processing apparatus 101 can suppress such a situation that, of a photograph slideshow content with music, only sound is outputted or only an image is displayed.

Further, since the output vector data production section 242 detects a tail fade-out interval and applies a fade-out process to an image content allocated to the interval (adds a setting for performing a fade-out process to the vector data) or applies an additional image process to the image content (adds an additional image process setting to the vector data), the information processing apparatus 101 can provide images which coincides in atmosphere with the BGM as a slideshow to the user (provide a slideshow, whose BGM and images provide a sense of togetherness, to the user). Consequently, the information processing apparatus 101 can enhance the degree of completeness as a content of a slideshow and enhance the degree of satisfaction of the user, who enjoys the content, with the slideshow.

It is to be noted that the template described hereinabove may be prepared in advance in the information processing apparatus 101 or may be downloaded from a server connected through a network or fetched through the optical disk 225 or the like.

While the series of processes described above can be executed by hardware, it may otherwise be executed by software.

Where the series of processes described above are executed by software, a program which constructs the software is installed from a network or a recording medium into a computer incorporated in hardware for exclusive use or, for example, a personal computer for universal use which can execute various functions by installing various programs.

The recording medium, as shown in FIG. 8, may be formed as a memory card 223 or an optical disk 225 which has the program recorded thereon or therein and is distributed in order to provide the program to a user separately from an apparatus body, or as a ROM 212 or a hard disk included in a HDD 220 which has the program recorded therein or thereon and is provided to a user in a form wherein it is incorporated in an apparatus body in advance.

It is to be noted that, in the present specification, the steps may not be necessarily processed, as well as may be processed, in a time series in the order as described, and include processes which are executed in parallel or individually without being processed in a time series.

While preferred embodiments of the present invention have been described using specific terms, such description is for illustrative purposes only, and it is to be understood that changes and variations may be made without departing from the spirit or scope of the following claims.

What is claimed is:

1. An information processing apparatus for reproducing sound data and image data, comprising:

a play interval specification section for specifying a play interval within which sound of the sound data to be reproduced as background music exists; and a reproduction control information production section for allocating the image data to the play interval specified within a full reproduction interval of the sound data, including a tail fade-out interval at the tail of the play interval and excluding a head no-sound interval and a tail no-sound interval, and producing reproduction control information for controlling reproduction of the sound data and the image data so that the image data are reproduced only while the reproduction data within the play interval are reproduced, wherein the head no-sound interval and the tail no-sound interval are intervals within which sound output level is zero, and wherein the tail fade-out interval is an interval within which the sound output level decreases from a nonzero value to zero.

2. The information processing apparatus according to claim 1, wherein the reproduction control information is vector data.

3. The information processing apparatus according to claim 1, wherein the reproduction control information comprises a set of pieces of effect control information of vector data which is control information of effect processes for the individual image data whose reproduction is to be controlled.

4. The information processing apparatus according to claim 1, further comprising:

a head no-sound interval detection section for detecting a head no-sound interval at the head of the sound data; and a tail no-sound interval detection section for detecting a tail no-sound interval at the tail of the sound data.

5. The information processing apparatus according to claim 1, further comprising:

a tail fade-out interval detection section for detecting a tail fade-out interval at the tail of the play interval specified by said play interval specification section; and a fade-out process setting section for setting the reproduction control information so that a fade-out image process may be applied to the image data allocated to the tail fade-out interval detected by said tail fade-out interval detection section.

6. The information processing apparatus according to claim 1, further comprising:

an additional image process setting section for setting the reproduction control information so that an additional image process may be applied to the image data to which the reproduction control information produced by said reproduction control information production section corresponds.

7. The information processing apparatus according to claim 1, further comprising:

a reproduction time details information analysis section for analyzing reproduction time details information which is meta data of the image data to acquire information regarding the play interval, wherein said reproduction control information production section producing the reproduction control information based on the information regarding the play interval obtained by the analysis of the reproduction time details information by said reproduction time details information analysis section in place of the play interval specified by said play interval specification section.

8. The information processing apparatus according to claim 1, further comprising:

a reproduction time details information storage control section for controlling so that reproduction time details information is produced from the reproduction control information produced by said reproduction control information production section and is stored into a storage section.

9. The information processing apparatus according to claim 1, further comprising:

a decompression section for decompressing the sound data where the sound data reproduced as the background music are compressed data.

10. An information processing method for an information processing apparatus for reproducing sound data and image data, comprising the steps of:

specifying a play interval within which sound of the sound data to be reproduced as background music exists; and allocating the image data to the play interval specified within a full reproduction interval of the sound data, including a tail fade-out interval at the tail of the play interval and excluding a head no-sound interval and a tail no-sound interval, and producing reproduction control information for controlling reproduction of the sound data and the image data so that the image data are reproduced only while the reproduction data within the play interval are reproduced, wherein the head no-sound interval and the tail no-sound interval are intervals within which sound output level is zero, and wherein the tail fade-out interval is an interval within which the sound output level decreases from a nonzero value to zero.

11. A non-transitory computer-readable medium storing a program that when executed on a computer causes a process relating to sound data and image data, the program comprising the steps of:

specifying a play interval within which sound of the sound data to be reproduced as background music exists; and allocating the image data to the play interval specified within a full reproduction interval of the sound data, including a tail fade-out interval at the tail of the play interval and excluding a head no-sound interval and a tail no-sound interval, and producing reproduction control information for controlling reproduction of the sound data and the image data so that the image data are reproduced only while the reproduction data within the play interval are reproduced, wherein the head no-sound interval and the tail no-sound interval are intervals within which sound output level is zero, and wherein the tail fade-out interval is an interval within which the sound output level decreases from a nonzero value to zero.

* * * * *